United States Patent
Lee et al.

(10) Patent No.: US 11,750,335 B2
(45) Date of Patent: *Sep. 5, 2023

(54) METHOD AND APPARATUS FOR TRANSMITTING SIDELINK HARQ FEEDBACK IN NR V2X

(71) Applicant: LG Electronics Inc., Seoul (KR)

(72) Inventors: Seungmin Lee, Seoul (KR); Hanbyul Seo, Seoul (KR)

(73) Assignee: LG ELECTRONICS INC., Seou (KR)

( * ) Notice: Subject to any disclaimer, the term of this patent is extended or adjusted under 35 U.S.C. 154(b) by 157 days.

This patent is subject to a terminal disclaimer.

(21) Appl. No.: 17/331,441

(22) Filed: May 26, 2021

(65) Prior Publication Data

US 2021/0288759 A1   Sep. 16, 2021

Related U.S. Application Data

(63) Continuation of application No. 16/593,905, filed on Oct. 4, 2019, now Pat. No. 11,108,507.
(Continued)

(30) Foreign Application Priority Data

Oct. 2, 2019  (WO) ................ PCT/KR2019/012906

(51) Int. Cl.
*H04W 76/11* (2018.01)
*H04L 1/1812* (2023.01)
(Continued)

(52) U.S. Cl.
CPC ............. *H04L 1/1819* (2013.01); *H04W 4/40* (2018.02); *H04W 72/0473* (2013.01); *H04W 76/11* (2018.02); *H04W 92/18* (2013.01)

(58) Field of Classification Search
CPC ... H04W 76/11; H04W 72/0473; H04W 4/40; H04W 92/18; H04W 72/04; H04W 88/08; H04W 76/00
See application file for complete search history.

(56) References Cited

U.S. PATENT DOCUMENTS

2016/0269885 A1*  9/2016  Kim ..................... H04W 8/005
2018/0049084 A1   2/2018  Lee et al.
(Continued)

FOREIGN PATENT DOCUMENTS

CN         108112087      6/2018
JP         2020507264     3/2020
(Continued)

OTHER PUBLICATIONS

Huawei, HiSilicon, "Support for sidelink unicast, groupcast and broadcast" R1-1810137, 3GPP TSG RAN WG1 Meeting #94bis, Chengdu, China, Oct. 8-12, 2018, 9 pages.
(Continued)

*Primary Examiner* — Hassan A Phillips
*Assistant Examiner* — Prenell P Jones
(74) *Attorney, Agent, or Firm* — Fish & Richardson P.C.

(57) ABSTRACT

Provided herein are a method of transmitting a Sidelink Hybrid Automatic Repeat Request (SL HARQ) feedback by a first device and a device supporting the same. The method may include the steps of receiving a Physical Sidelink Shared Channel (PSSCH) from a second device, and transmitting a SL HARQ feedback related to the PSSCH to the second device, wherein a resource in which the SL HARQ feedback is transmitted is determined based on an identifier (ID) of the first device.

20 Claims, 32 Drawing Sheets

Related U.S. Application Data

(60) Provisional application No. 62/741,474, filed on Oct. 4, 2018.

(51) Int. Cl.
*H04W 72/044* (2023.01)
*H04W 4/40* (2018.01)
*H04W 92/18* (2009.01)

(56) References Cited

U.S. PATENT DOCUMENTS

| | | | |
|---|---|---|---|
| 2020/0029318 A1* | 1/2020 | Guo | H04W 72/042 |
| 2020/0187252 A1 | 6/2020 | Lee et al. | |
| 2020/0305176 A1 | 9/2020 | Hu et al. | |

FOREIGN PATENT DOCUMENTS

| WO | WO2017143530 | 8/2017 |
|---|---|---|
| WO | WO 2019064983 | 4/2019 |
| WO | WO2020038165 | 2/2020 |
| WO | WO 2020144787 | 7/2020 |

OTHER PUBLICATIONS

ITL, "Discussion on NR V2X HARQ mechanism", R1-1811615, 3GPP TSG-RAN WG1 Meeting #94bis, Chengdu, China, Oct. 8-12, 2018, 4 pages.

U.S. Appl. No. 62/720,766, Lin et al., "Feedback Channel Design," filed Aug. 21, 2018, 10 pages.

LG Electronics, "Discussion on physical layer procedures for NR sidelink," 3GPP TSG RAN WG1 Meeting #96bis, R1-1905443, Xi'an, China, Apr. 8-12, 2019, 12 pages.

Office Action in Japanese Application No. 2021-518093, dated May 17, 2022, 7 pages (with English translation).

Extended European Search Report in European Appln. No. 19870030. 4, dated Nov. 26, 2021, 6 pages.

Lenovo & Motorola, "Support of unicast, groupcast and broadcast in NR V2X," R1-1810573, Presented at 3GPP TSG RAN WG1 Meeting #94bis, Chengdu, China, Oct. 8-12, 2018, 5 pages.

* cited by examiner

FIG. 9
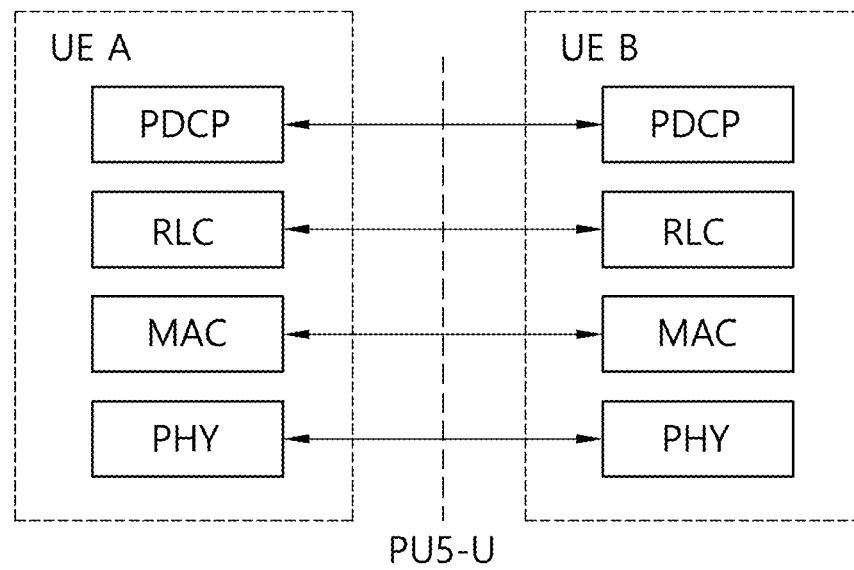
(a)
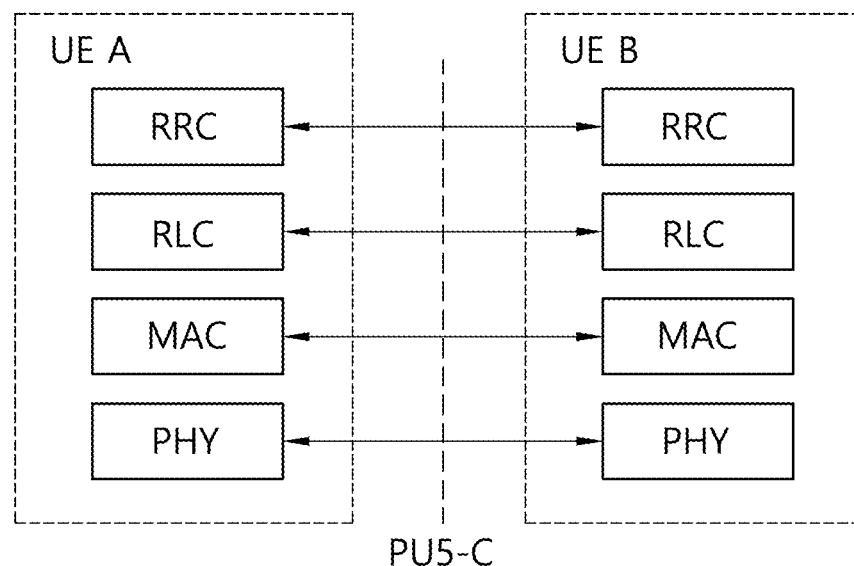
(b)

FIG. 10
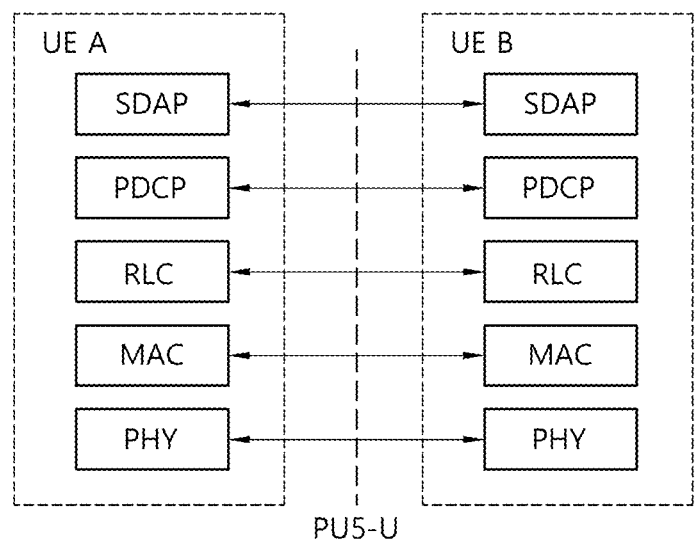
(a)
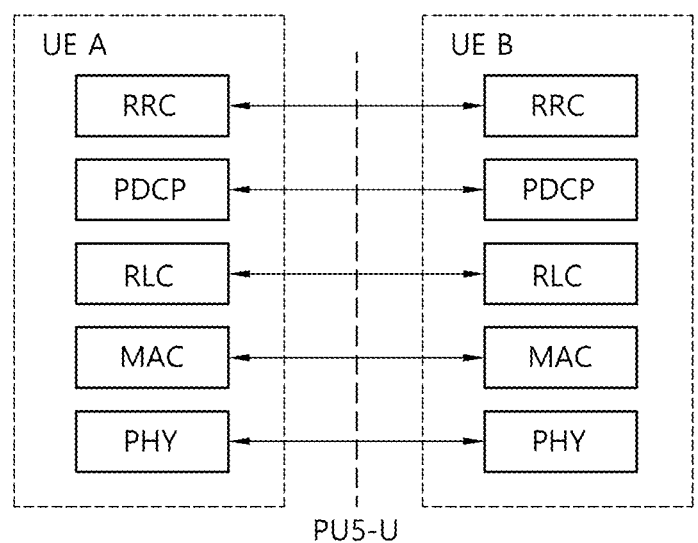
(b)

METHOD AND APPARATUS FOR TRANSMITTING SIDELINK HARQ FEEDBACK IN NR V2X

CROSS-REFERENCE TO RELATED APPLICATIONS

This application is a continuation of U.S. application Ser. No. 16/593,905, filed on Oct. 4, 2019, which claims the benefit pursuant to 35 U.S.C. § 119 (e) of U.S. Provisional Application No. 62/741,474 filed on Oct. 4, 2018, and International application No. PCT/KR2019/012906 filed on Oct. 2, 2019, the contents of which are all hereby incorporated by reference herein in their entirety.

FIELD OF THE DISCLOSURE

This disclosure relates to a wireless communication system.

RELATED ART

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, a wireless communication system may need to estimate an uplink channel or downlink channel to transmit/receive data, to achieve system synchronization, and to feedback channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Meanwhile, for example, in case of SL communication being associated with a service having requirements of high reliability or a service having requirements of relatively high reliability, SL HARQ feedback operations and/or mechanism of a user equipment (UE) may be useful. For example, in case multiple UEs perform HARQ feedback transmission, collision may occur between the HARQ feedback transmissions. This may lead to a service latency (or delay). Therefore, in case multiple UEs perform HARQ feedback transmission, a method for minimizing collision and a device for supporting the same are needed.

According to an embodiment, provided herein is a method of transmitting a Sidelink Hybrid Automatic Repeat Request (SL HARQ) feedback by a first device 100. The method may include the steps of receiving a Physical Sidelink Shared Channel (PSSCH) from a second device 200, and transmitting a SL HARQ feedback related to the PSSCH to the second device 200, wherein a resource in which the SL HARQ feedback is transmitted may be determined based on an identifier (ID) of the first device 100.

According to another embodiment, provided herein is a method for receiving a Sidelink Hybrid Automatic Repeat Request (SL HARQ) feedback by a second device 200. The method may include the steps of transmitting a Physical Sidelink Shared Channel (PSSCH) to a plurality of user equipments (UEs) within a group, and receiving an SL HARQ feedback related to the PSSCH from the plurality of UEs, wherein a resource in which the SL HARQ feedback is received may be determined based on identifiers (IDs) of the plurality of UEs.

According to another embodiment, provided herein is a first device 100 transmitting a Sidelink Hybrid Automatic Repeat Request SL HARQ) feedback. The first device 100 may include one or more memories, one or more transceivers, and one or more processors operatively connecting the one or more memories and the one or more transceivers, wherein the processor may be configured to control the transceiver 106 so as to receive a Physical Sidelink Shared Channel (PSSCH) from a second device 200, and to control the transceiver 106 so as to transmit a SL HARQ feedback related to the PSSCH to the second device 200, wherein a resource in which the SL HARQ feedback is transmitted may be determined based on an identifier (ID) of the first device 100.

A UE can efficiently perform SL communication.

BRIEF DESCRIPTION OF THE DRAWINGS

FIG. 9 shows a protocol stack for a SL communication, in accordance with an embodiment of the present disclosure.

FIG. 10 shows a protocol stack for a SL communication, in accordance with an embodiment of the present disclosure.

DESCRIPTION OF EXEMPLARY EMBODIMENTS

In various embodiments of the present disclosure, it shall be interpreted that "/" and "," indicate "and/or". For example, "A/B" may mean "A and/or B". Additionally, "A, B" may also mean "A and/or B". Moreover, "A/B/C" may mean "at least one of A, B and/or C". Furthermore, "A, B, C" may also mean "at least one of A, B and/or C".

Furthermore, in various embodiments of the present disclosure, it shall be interpreted that "or" indicates "and/or". For example, "A or B" may include "only A", "only B", and/or "both A and B". In other words, in various embodiments of the present disclosure, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
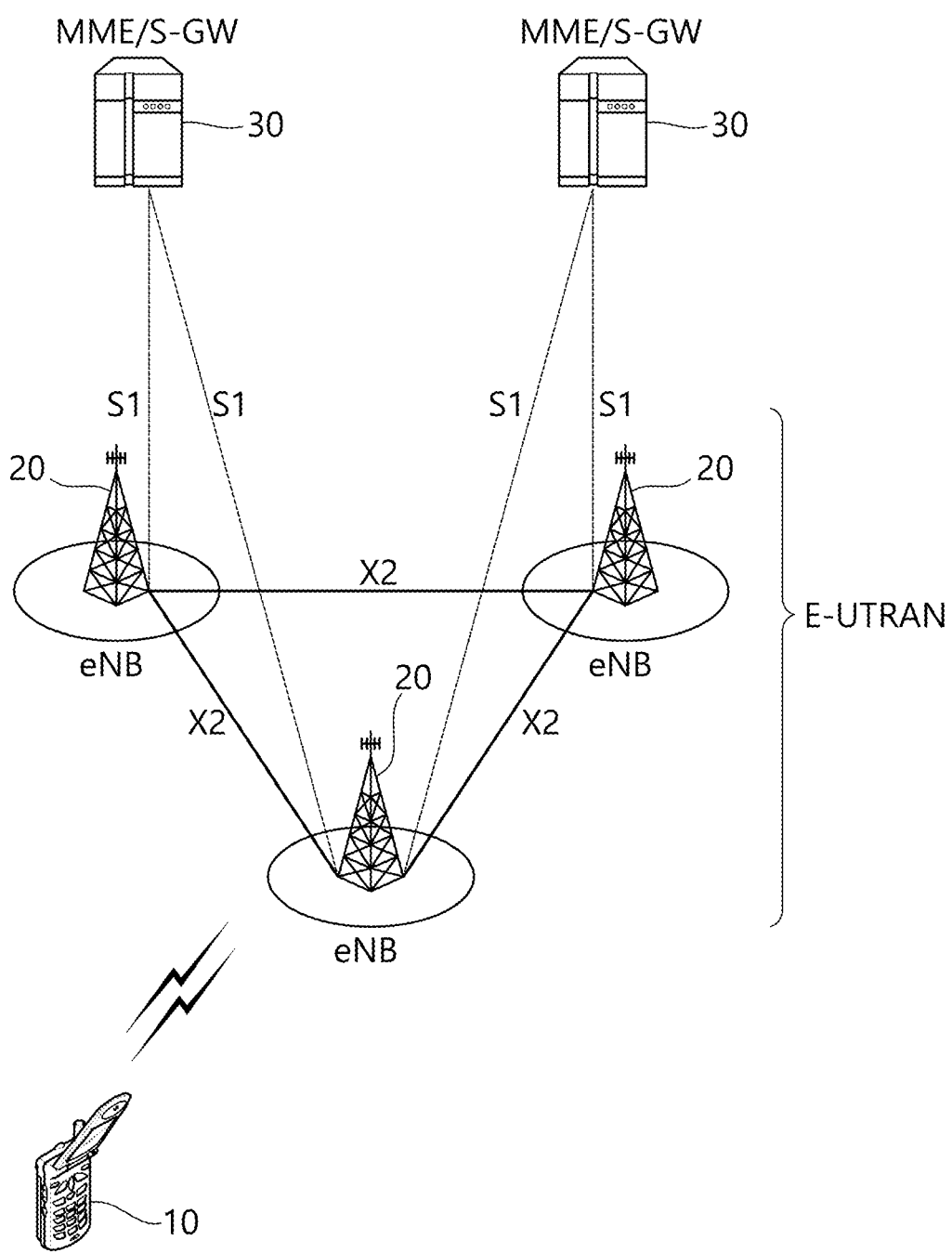
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicates with the UE 10 and may also be referred to by using different terms, such as evolved-NodeB (eNB), Base Transceiver System (BTS), Access Point (AP), and so on.

The base stations 20 are interconnected to one another through an X2 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
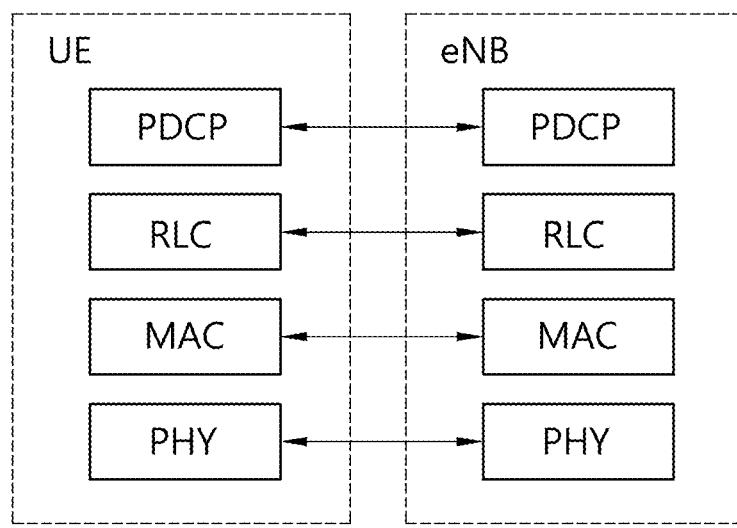
FIG. 2 shows a radio protocol architecture of a user plane, in accordance with an embodiment of the present disclosure.
Figure 3:
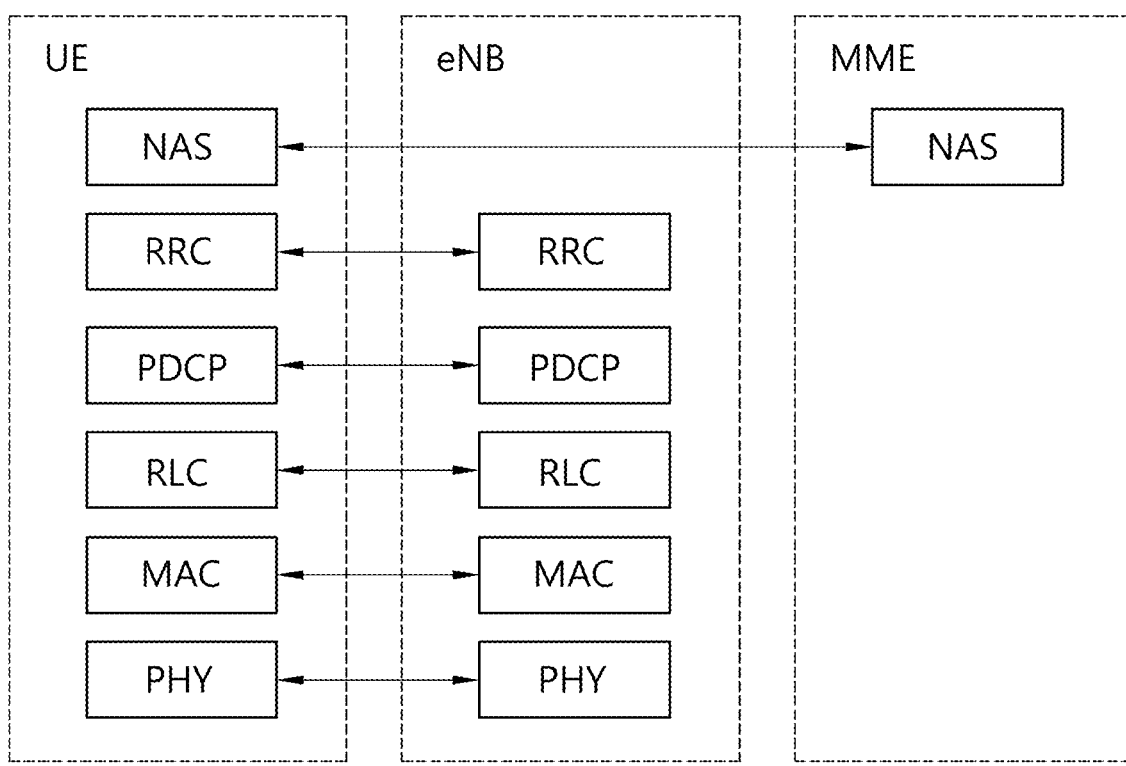
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs functions concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
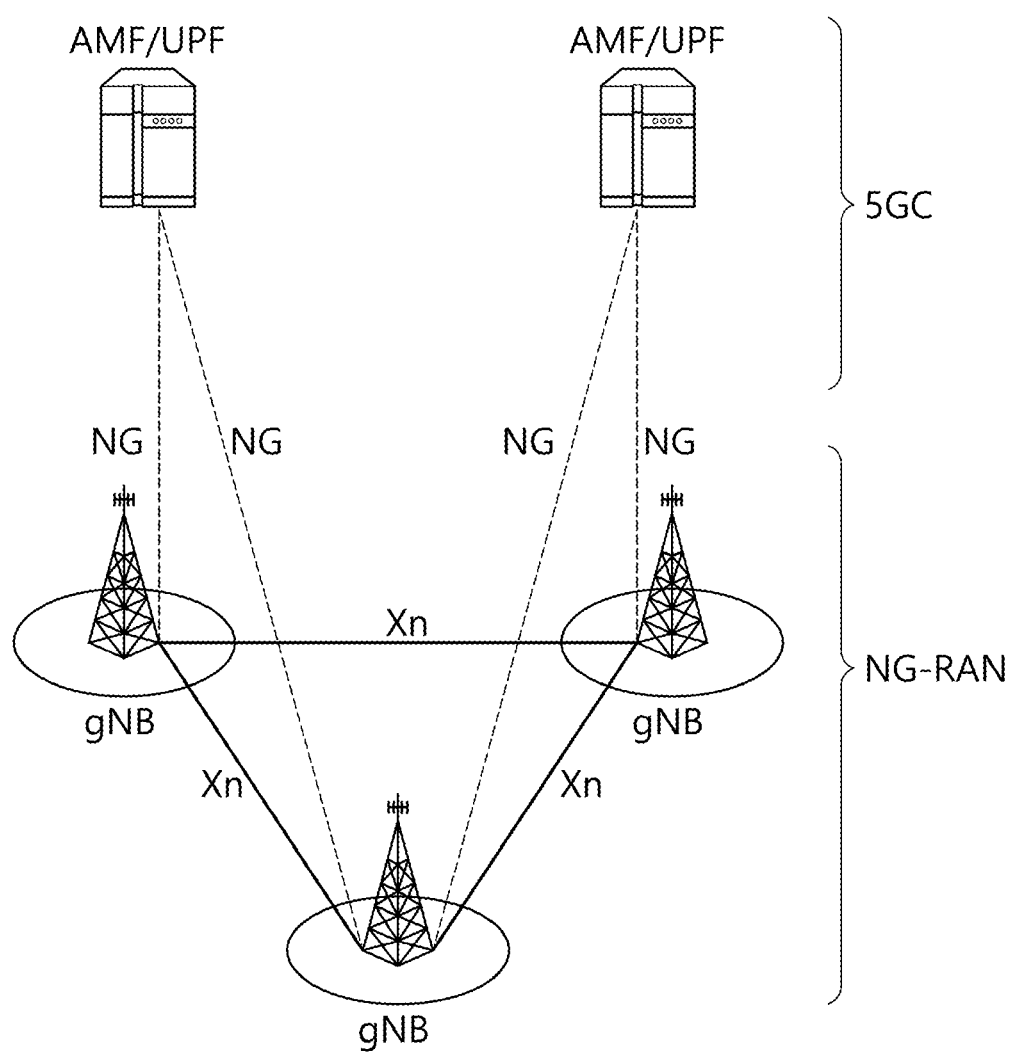
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via $5^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
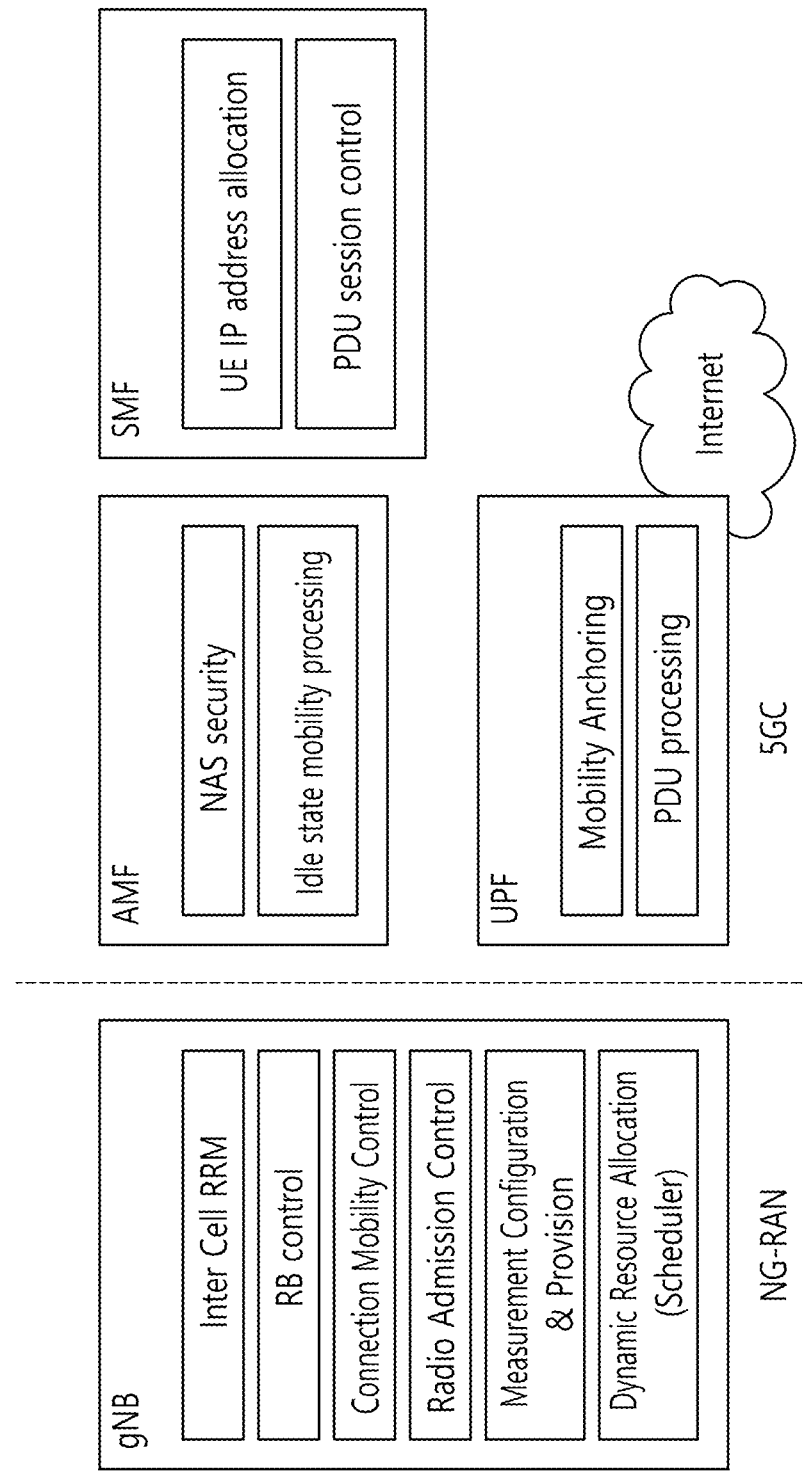
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
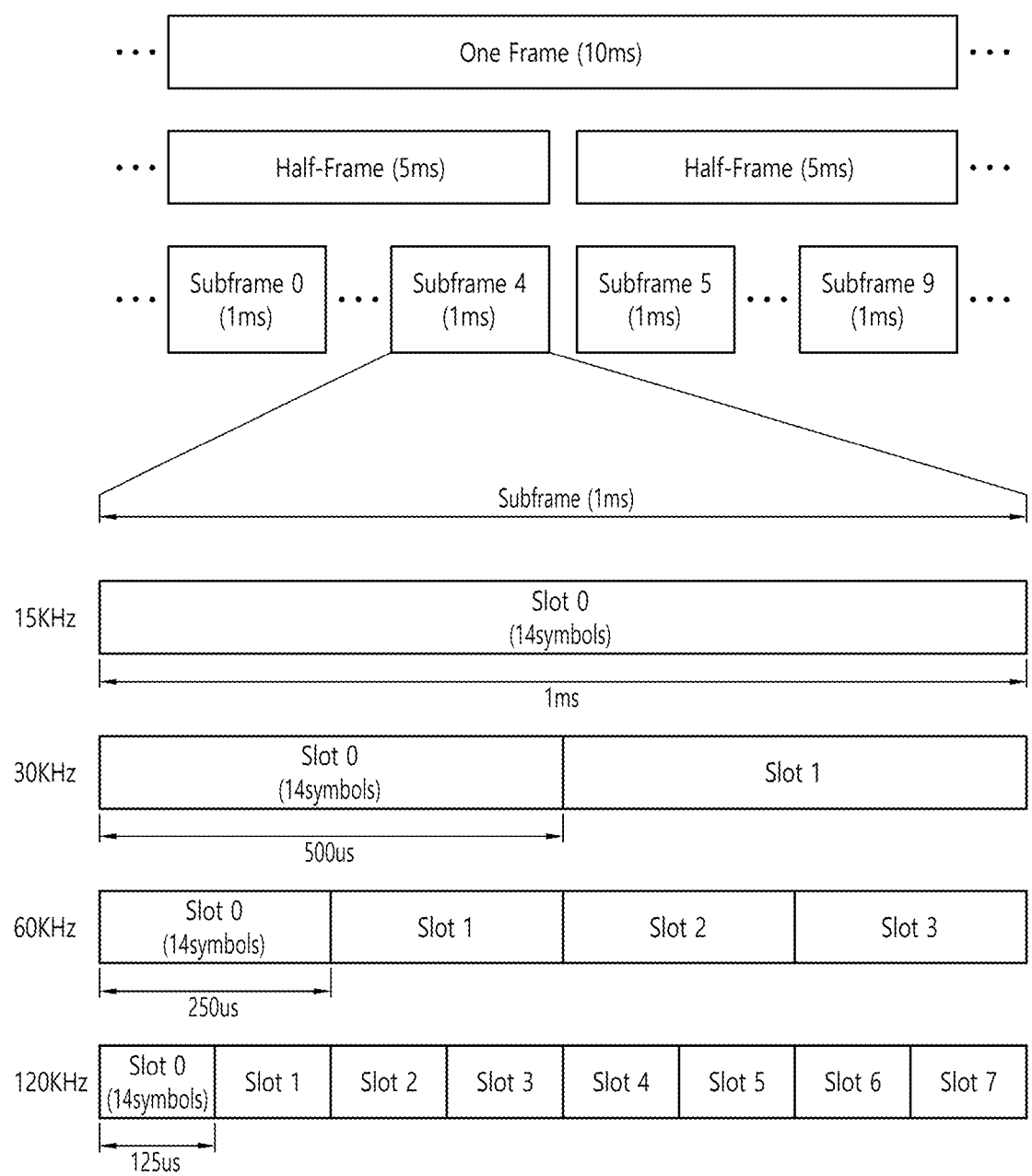
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
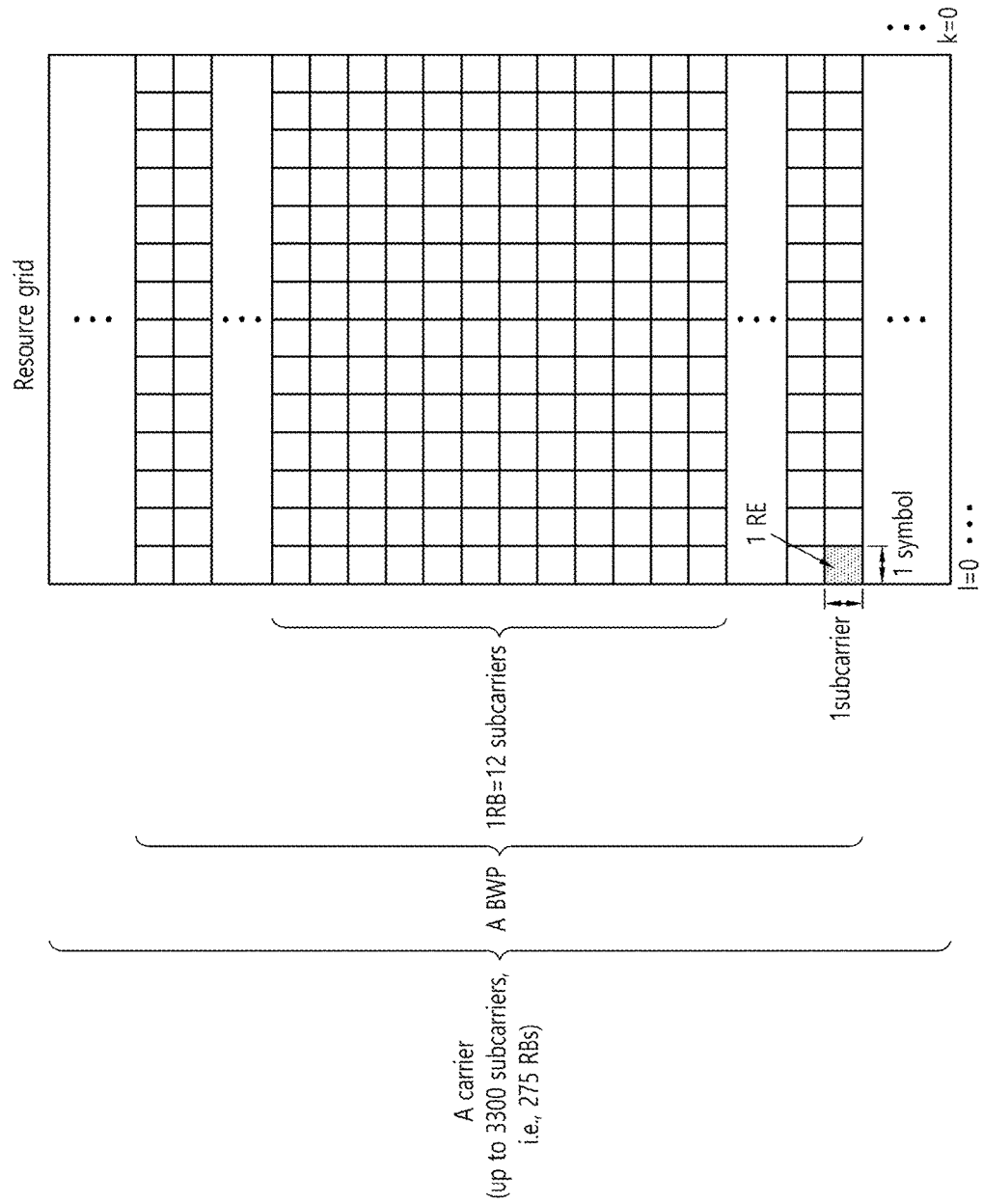
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an RRC_IDLE UE. For a UE operating in the RRC_CONNECTED mode, at least one SL BWP may be activated within a carrier.

Figure 8:
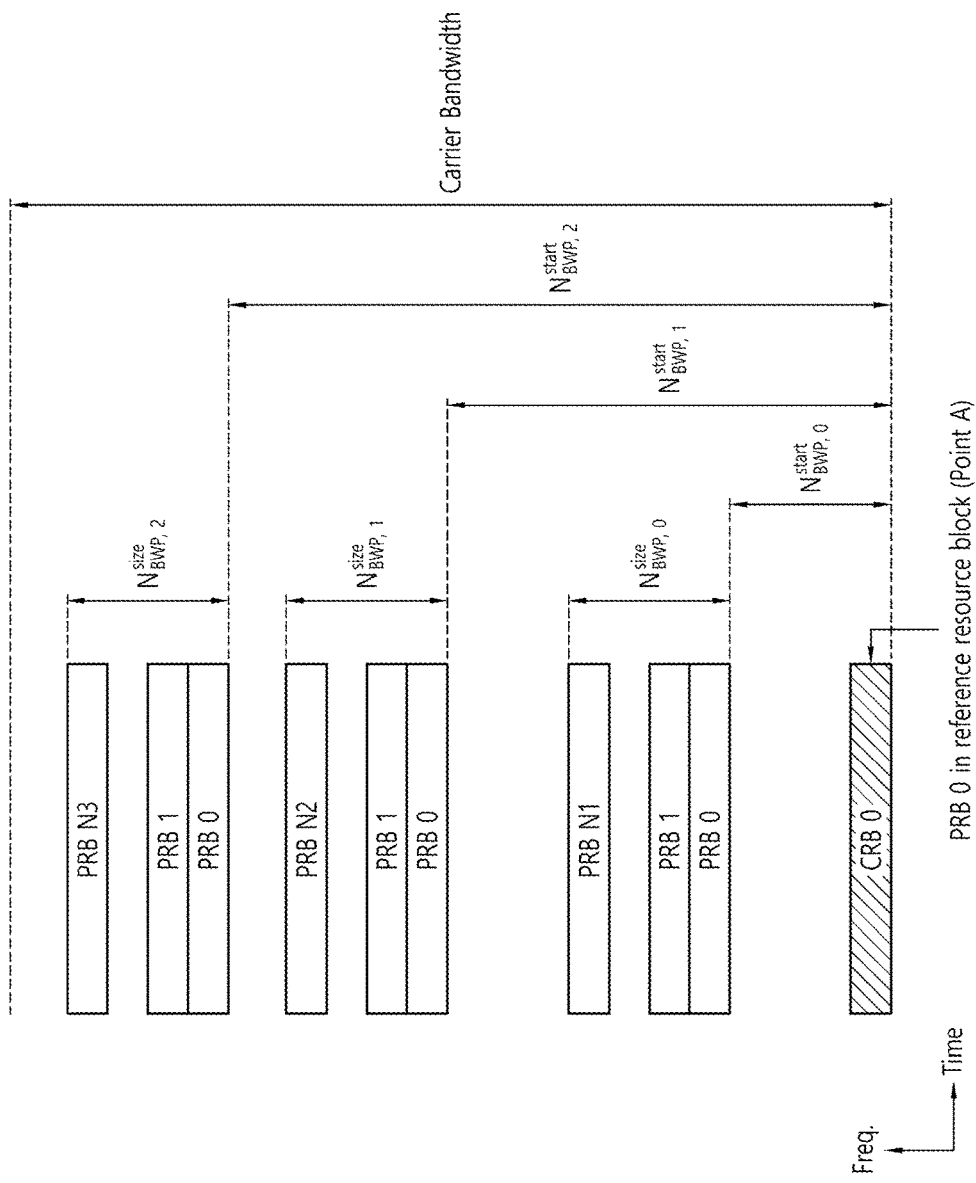
FIG. 8 shows an example of a BWP, in accordance with an embodiment of the present disclosure.

FIG. 8 shows an example of a BWP, in accordance with an embodiment of the present disclosure. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, V2X or SL communication will be described.

FIG. 9 shows a protocol stack for a SL communication, in accordance with an embodiment of the present disclosure. More specifically, (a) of FIG. 9 shows a user plane protocol stack of LTE, and (b) of FIG. 9 shows a control plane protocol stack of LTE.

FIG. 10 shows a protocol stack for a SL communication, in accordance with an embodiment of the present disclosure.

More specifically, (a) of FIG. 10 shows a user plane protocol stack of NR, and (b) of FIG. 10 shows a control plane protocol stack of NR.

Hereinafter, SL Synchronization Signal (SLSS) and synchronization information will be described.

SLSS is a SL specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving SL signals. For example, the basic information may be information related to SLSS, a Duplex mode (DM), Time Division Duplex Uplink/Downlink (TDD UL/DL) configuration, information related to a resource pool, application types related to SLSS, a subframe offset, broadcast information, and so on.

The S-PSS, the S-SSS, and the PSBCH may be included in a block format (e.g., a SL SS/PSBCH block, hereinafter referred to as Sidelink-Synchronization Signal Block (S-SSB)). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL Bandwidth Part (BWP). And, a frequency position of the S-SSB may be (pre-)configured. Therefore, the UE is not required to perform a hypothesis detection in order to discover the S-SSB in the carrier.

Each SLSS may have a physical layer SL synchronization identity (ID), and the respective value may be equal to any one value ranging from 0 to 335. Depending upon one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer SL synchronization ID values, values 0 to 167 may correspond to value being used by a network, and values from 168 to 335 may correspond to value being used outside of the network coverage.

Figure 11:
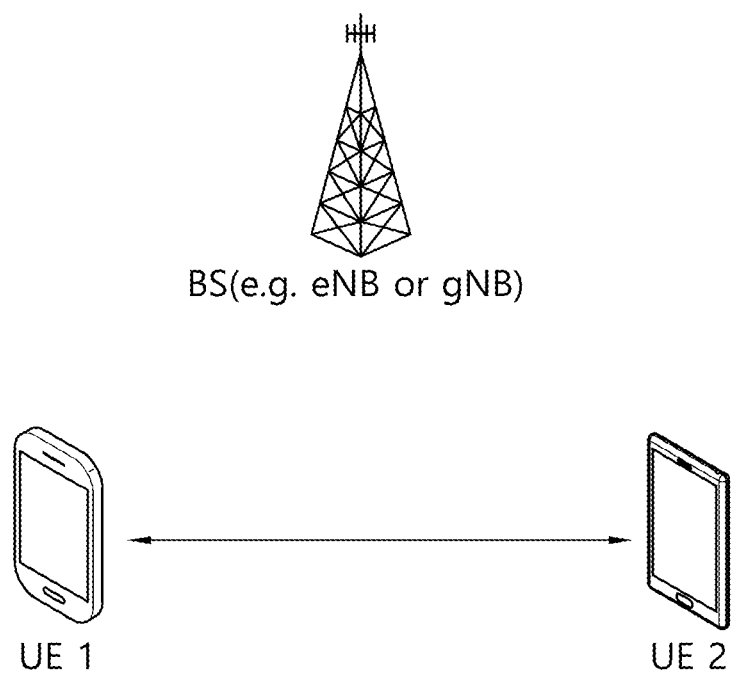
FIG. 11 shows a UE performing V2X or SL communication, in accordance with an embodiment of the present disclosure.

FIG. 11 shows a UE performing V2X or SL communication, in accordance with an embodiment of the present disclosure.

Referring to FIG. 11, in V2X/SL communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a SL signal by using the corresponding resource unit. User equipment 2 (UE2), which is to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside a connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its SL signal transmission.

Figure 12:
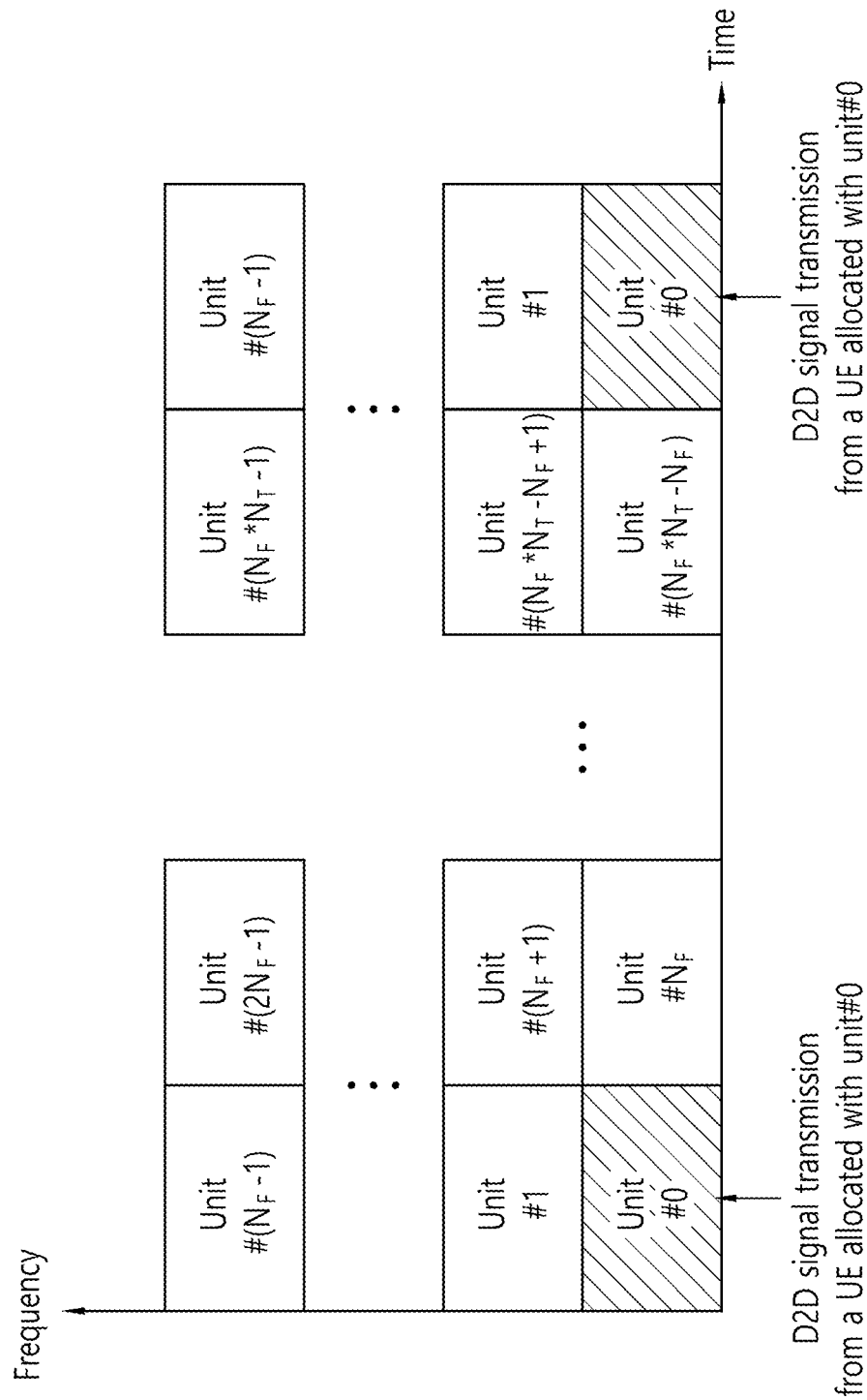
FIG. 12 shows a resource unit for V2X or SL communication, in accordance with an embodiment of the present disclosure.

FIG. 12 shows a resource unit for V2X or SL communication, in accordance with an embodiment of the present disclosure.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of $N_T$ number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit SL signals.

The resource pool may be segmented to multiple types. For example, depending upon the content of a SL signal being transmitted from each resource pool, the resource pool may be divided as described below.

(1) Scheduling Assignment (SA) may correspond to a signal including information, such as a position of a resource that is used for the transmission of a SL data channel, a Modulation and Coding Scheme (MCS) or Multiple Input Multiple Output (MIMO) transmission scheme needed for the modulation of other data channels, a Timing Advance (TA), and so on. The SA may also be multiplexed with SL data within the same resource unit and may then be transmitted, and, in this case, an SA resource pool may refer to a resource pool in which the SA is multiplexed with the SL data and then transmitted. The SA may also be referred to as a SL control channel.

(2) A Physical Sidelink Shared Channel (PSSCH) may be a resource pool that is used by a transmitting UE for transmitting user data. If the SA is multiplexed with SL data within the same resource unit and then transmitted, only a SL data channel excluding the SA information may be transmitted from the resource pool that is configured for the SL data channel. In other words, REs that were used for transmitting SA information within a separate resource unit of the SA resource pool may still be used for transmitting SL data from the resource pool of a SL data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described SL signal is the same, different resource pools may be used depending upon the transmission/reception attribute of the SL signal. For example, even if the same SL data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each SL signal within a subframe or a number of subframes being used for the transmission of one SL signal) of the SL signal, signal intensity from the base station, a transmitting power intensity (or level) of a SL UE, and so on.

Hereinafter, resource allocation in a SL will be described.

Figure 13:
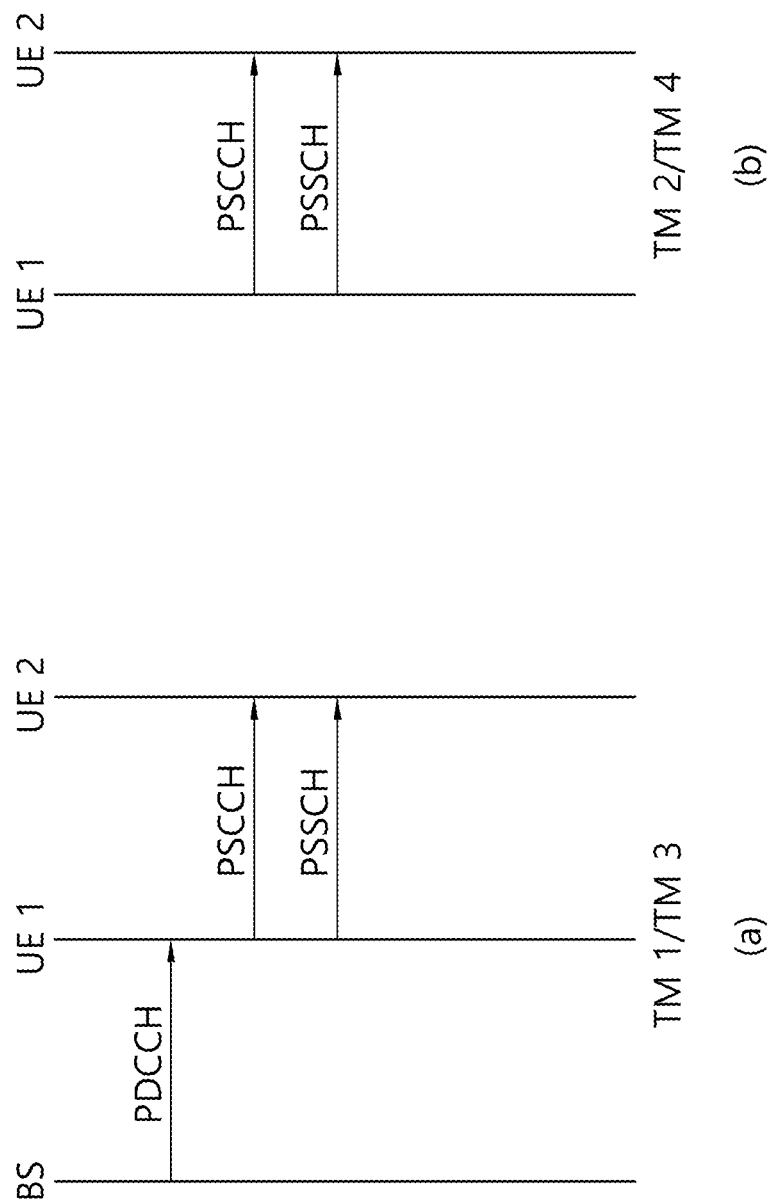
FIG. 13 shows procedures of a UE performing V2X or SL communication according to a transmission mode (TM), in accordance with an embodiment of the present disclosure.

FIG. 13 shows procedures of a UE performing V2X or SL communication according to a transmission mode (TM), in accordance with an embodiment of the present disclosure. Specifically, (a) of FIG. 13 shows a UE operation related to a transmission mode 1 or a transmission mode 3, and (b) of FIG. 13 shows a UE operation related to a transmission mode 2 or a transmission mode 4.

Referring to (a) of FIG. 13, in transmission modes 1/3, the base station performs resource scheduling to UE1 via PDCCH (more specifically, Downlink Control Information (DCI)), and UE1 performs SL/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE SL, transmission mode 1 may be applied to a general SL communication, and transmission mode 3 may be applied to a V2X SL communication.

Referring to (b) of FIG. 13, in transmission modes 2/4, the UE may schedule resources on its own. More specifically, in case of LTE SL, transmission mode 2 may be applied to a general SL communication, and the UE may select a resource from a predetermined resource pool on its own and may then perform SL operations. Transmission mode 4 may be applied to a V2X SL communication, and the UE may carry out a sensing/SA decoding procedure, and so on, and select a resource within a selection window on its own and may then perform V2X SL operations. After transmitting the SCI to UE2 via PSCCH, UE1 may transmit SCI-based data via PSSCH. Hereinafter, the transmission mode may be abbreviated to the term mode.

In case of NR SL, at least two types of SL resource allocation modes may be defined. In case of mode 1, the base station may schedule SL resources that are to be used for SL transmission. In case of mode 2, the user equipment (UE) may determine a SL transmission resource from SL resources that are configured by the base station/network or predetermined SL resources. The configured SL resources or the pre-determined SL resources may be a resource pool. For example, in case of mode 2, the UE may autonomously select a SL resource for transmission. For example, in case of mode 2, the UE may assist (or help) SL resource selection of another UE. For example, in case of mode 2, the UE may be configured with an NR configured grant for SL transmission. For example, in case of mode 2, the UE may schedule SL transmission of another UE. And, mode 2 may at least support reservation of SL resources for blind retransmission.

Procedures related to sensing and resource (re-)selection may be supported in resource allocation mode 2. The sensing procedure may be defined as a process decoding the SCI from another UE and/or SL measurement. The decoding of the SCI in the sensing procedure may at least provide information on a SL resource that is being indicated by a UE transmitting the SCI. When the corresponding SCI is decoded, the sensing procedure may use L1 SL Reference Signal Received Power (RSRP) measurement, which is based on SL Demodulation Reference Signal (DMRS). The resource (re-)selection procedure may use a result of the sensing procedure in order to determine the resource for the SL transmission.

Figure 14:
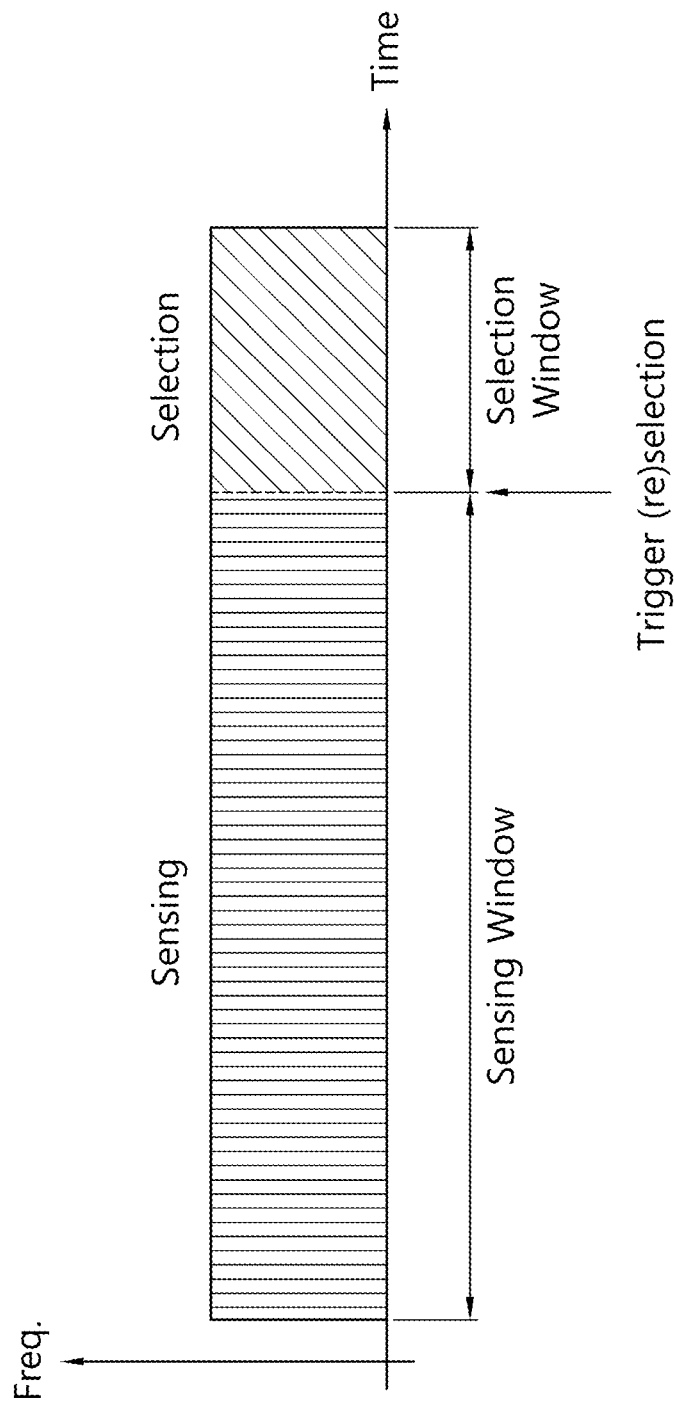
FIG. 14 shows a method of selecting a transmission resource by a UE, in accordance with an embodiment of the present disclosure.

FIG. 14 shows a method of selecting a transmission resource by a UE, in accordance with an embodiment of the present disclosure.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceeds a threshold value from the selection window. Thereafter, the UE may randomly select a SL resource from the remaining resources within the selection window.

Alternatively, the UE may measure a Received Signal Strength Indicator (RSSI) of the periodic resources within the sensing window and may then determine the resources having low interference (e.g., the lower 20% of the resources). Additionally, the UE may also randomly select a SL resource from the resources included in the selection window among the periodic resources. For example, in case the UE fails to perform decoding of the PSCCH, the UE may use the above described methods.

Figure 15:
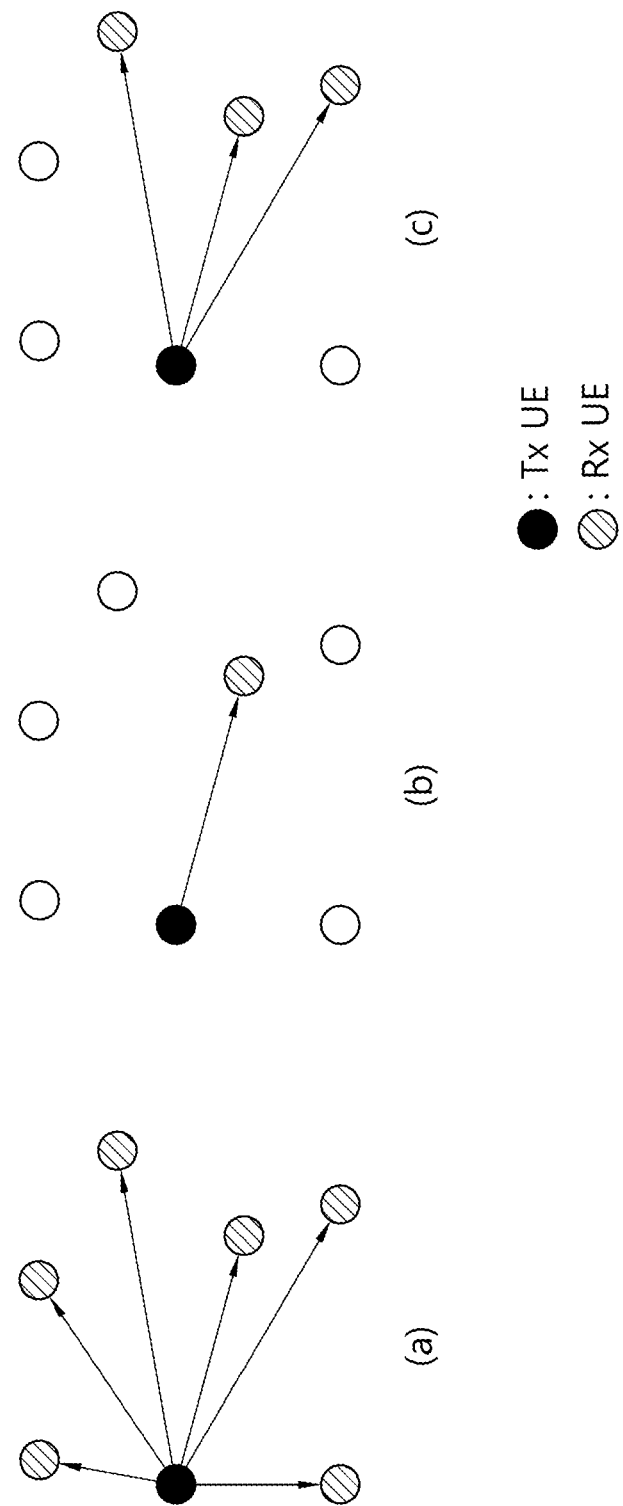
FIG. 15 shows three different cast types, in accordance with an embodiment of the present disclosure.

FIG. 15 shows three different cast types, in accordance with an embodiment of the present disclosure.

More specifically, (a) of FIG. 15 shows a broadcast type SL communication, (b) of FIG. 15 shows a unicast type SL communication, and (c) of FIG. 15 shows a groupcast type SL communication. In case of the broadcast type SL communication, the UE may perform one-to-one communication with another UE. And, in case of the unicast type SL communication, the UE may perform SL communication with one or more other UEs within the group to which the corresponding UE belongs. In the various embodiments of the present disclosure, the SL groupcast communication may be replaced with SL multicast communication, SL one-to-many communication, and so on.

Hereinafter, a Hybrid Automatic Repeat Request (HARQ) procedure in an SL will be described in detail.

In case of SL unicast and SL groupcast, HARQ feedback and HARQ combining in a physical layer may be supported. For example, in case a receiving UE operates in a Resource Allocation Mode 1 or 2, the receiving UE may receive a PSSCH from a transmitting UE, and the receiving UE may transmit an HARQ feedback corresponding to the PSSCH to the transmitting UE by using a Sidelink Feedback Control Information (SFCI) format via Physical Sidelink Feedback Channel (PSFCH).

For example, an SL HARQ feedback may be enabled for the unicast. In this case, in a non-Code Block Group (non-CBG), the receiving UE may decode a PSCCH targeting the receiving UE, and, when the receiving UE successfully decodes a transport block associated with the PSCCH, the receiving UE may generate an HARQ-ACK. Thereafter, the receiving UE may transmit the HARQ-ACK to the transmitting UE. Conversely, after the receiving UE decodes the PSCCH targeting the receiving UE, if the receiving UE fails to successfully decode a transport block associated with the PSCCH, the receiving UE may generate an HARQ-NACK, and the receiving UE may transmit the HARQ-NACK to the transmitting UE.

For example, an SL HARQ feedback may be enabled for the groupcast. For example, during the non-CBG, two different types of HARQ feedback options may be supported for the groupcast.

(1) Groupcast option 1: After decoding a PSCCH targeting the receiving UE, if the receiving UE fails to decode a transport block associated with the PSCCH, the receiving UE may transmit an HARQ-NACK to a transmitting UE via a PSFCH. Conversely, when a receiving UE decodes a PSCCH targeting the receiving UE, and when the receiving UE successfully decodes a transport block associated with the PSCCH, the receiving UE may not transmit an HARQ-ACK to a transmitting UE.

(2) Groupcast option 2: After decoding a PSCCH targeting the receiving UE, if the receiving UE fails to decode a transport block associated with the PSCCH, the receiving UE may transmit an HARQ-NACK to a transmitting UE via a PSFCH. And, when the receiving UE decodes a PSCCH targeting the receiving UE, and when the receiving UE successfully decodes a transport block associated with the PSCCH, the receiving UE may transmit an HARQ-ACK to a transmitting UE via the PSFCH.

Meanwhile, for example, in case of SL communication being associated with a service having requirements of high reliability or a service having requirements of relatively high reliability, SL HARQ feedback operations and/or mechanism of a user equipment (UE) may be useful. For example, in case of SL communication being associated with a service having requirements of high reliability, an operation (or action) of transmitting an SL HARQ feedback to a UE having transmitted the service by a UE having received the corresponding service may be useful in satisfying the requirements of high reliability.

Hereinafter, in accordance with various embodiments of the present disclosure, a method of determining a resource or transmission power associated with an SL HARQ feedback transmission by a UE and a device for supporting the same will be described in detail. In the various embodiments of the present disclosure, the SL communication may include V2X communication.

At least one of the methods that are proposed in accordance with the various embodiments of the present disclosure may be applied to at least one of unicast communication, groupcast communication, and/or broadcast communication.

At least one of the methods that are proposed in accordance with the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, the receiving operation (or action) of the UE may include a decoding operation and/or receiving operation of an SL channel and/or SL signal (e.g., PSCCH, PSSCH, PSFCH, PSBCH, PSSS/SSSS, and so on). The receiving operation of the UE may include a decoding operation and/or receiving operation of a WAN DL channel and/or WAN DL signal (e.g., PDCCH, PDSCH, PSS/SSS, and so on). The receiving operation of the UE may include a sensing operation and/or CBR measuring operation. In the various embodiments of the present disclosure, the sensing operation of the UE may include a PSSCH DM-RS sequence based PSSCH-RSRP measuring operation, a PSSCH-RSRP measuring operation based on a PSSCH DM-RS sequence, which is scheduled by a PSCCH that is successfully decoded by the UE, a sidelink RSSI (S-RSSI) measuring operation, and/or an S-RSSI measuring operation based on a subchannel being associated with a V2X resource pool. In the various embodiments of the present disclosure, the transmitting operation of the UE may include a transmitting operation of an SL channel and/or SL signal (e.g., PSCCH, PSSCH, PSFCH, PSBCH, PSSS/SSSS, and so on). The transmitting operation may include a transmitting operation of a WAN UL channel and/or WAN UL signal (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority level, and, as the PPPP value becomes greater, this may indicate a low priority level. For example, as the PPPP value becomes smaller, this may indicate a high reliability level, and, as the PPPP value becomes greater, this may indicate a low reliability level. For example, a PPPP value related to a service, packet or message being associated with a high priority level may be smaller than a PPPP value related to a service, packet or message being associated with a low priority level. For example, a PPPP value related to a service, packet or message being associated with a high reliability level may be smaller than a PPPP value related to a service, packet or message being associated with a low reliability level.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be interchangeably extendedly interpreted as at least one of a BWP and/or resource pool. For example, a carrier may include at least one of a BWP and/or resource pool. For example, a carrier may include at least one or more BWPs. For example, a BWP may include one or more resource pool.

In the various embodiments of the present disclosure, an HARQ feedback resource may include an HARQ feedback transmission resource and/or an HARQ feedback reception resource. For example, the HARQ feedback transmission resource may include a resource for transmitting an HARQ feedback and/or a resource associated with the transmission of an HARQ feedback. For example, the HARQ feedback reception resource may include a resource for receiving an HARQ feedback and/or a resource associated with the reception of an HARQ feedback.

In the various embodiments of the present disclosure, a PSSCH resource may include a PSSCH transmission resource and/or PSSCH reception resource. For example, the PSSCH transmission resource may include a resource for transmitting the PSSCH and/or a resource associated with the transmission of the PSSCH. For example, the PSSCH reception resource may include a resource for receiving the PSSCH and/or a resource associated with the reception of the PSSCH.

In the various embodiments of the present disclosure, a PSCCH resource may include a PSCCH transmission resource and/or PSCCH reception resource. For example, the PSCCH transmission resource may include a resource for transmitting the PSCCH and/or a resource associated with the transmission of the PSCCH. For example, the PSCCH reception resource may include a resource for receiving the PSCCH and/or a resource associated with the reception of the PSCCH.

In the various embodiments of the present disclosure, the resource may include at least one of a time domain resource, a frequency domain resource, and/or a code domain resource.

For example, in case resource collision occurs during at least one of a PSSCH transmission, a PSCCH transmission and/or an HARQ feedback transmission, it may be difficult for the SL HARQ feedback procedure and/or operation of the UE to be correctly executed. For example, in case resource collision occurs during at least one of a PSSCH transmission, a PSCCH transmission and/or an HARQ feedback transmission, it may be difficult for the overall SL HARQ feedback procedure and/or operation of the UE to be accurately executed.

For example, although the receiving UE has successfully received the PSSCH, in case an error occurs in the HARQ feedback (e.g., HARQ ACK) due to the resource collision, the transmission UE may have to unnecessarily retransmit the PSSCH to the receiving UE. For example, in case the receiving UE fails to receive the PSSCH and the HARQ feedback fails to be transmitted to the transmitting UE due to the resource collision, the SL communication related reliability or capability (or performance) may be degraded. For example, in case the receiving UE fails to receive the PSCCH and/or PSSCH being transmitted from the transmitting UE, and in case an HARQ NACK corresponding to the PSCCH and/or PSSCH fails to be correctly delivered to the transmitting UE due to the resource collision, the SL communication related reliability or performance (or capability) may be degraded. Therefore, the HARQ feedback resource may need to be determined so that the collision between the plurality of UEs can be prevented or minimized.

Figure 16:
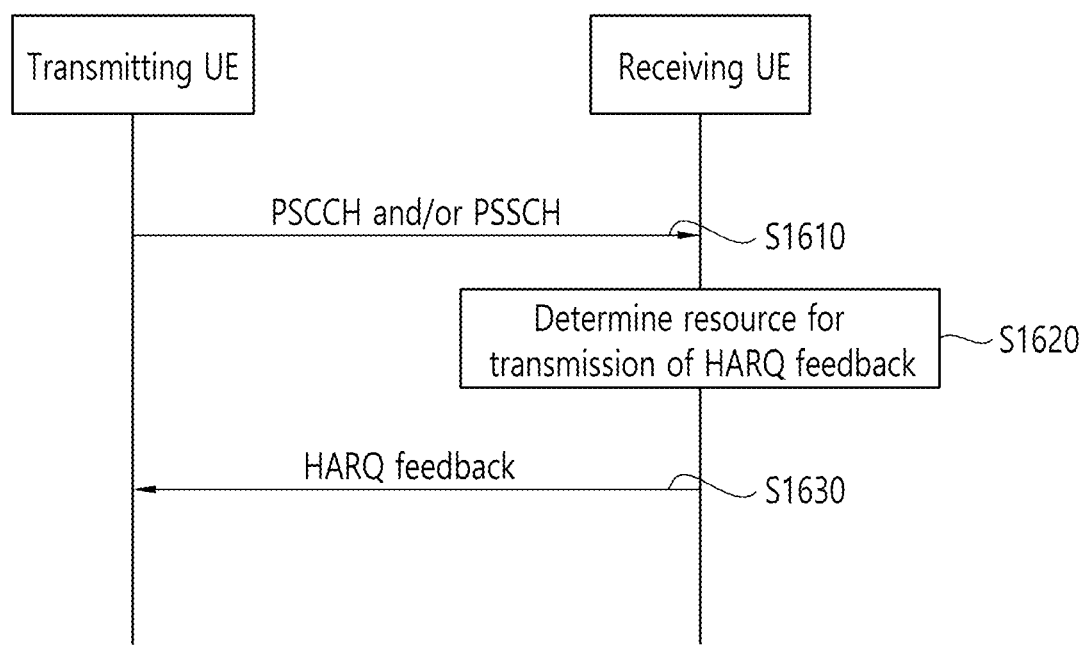
FIG. 16 shows a procedure for transmitting/receiving an HARQ feedback by a UE, in accordance with an embodiment of the present disclosure.

FIG. 16 shows a procedure for transmitting/receiving an HARQ feedback by a UE, in accordance with an embodiment of the present disclosure. The embodiment of FIG. 16 may be combined with other various embodiments.

Referring to FIG. 16, in step S1610, a transmitting UE may transmit a PSCCH and/or PSSCH to a receiving UE. For example, the transmitting UE may transmit SL information to the receiving UE by using a PSCCH resource and/or a PSSCH resource. For example, the SL information may include at least one of SL control information, SL data, SL packet, SL Transport Block (TB), SL message and/or SL service.

In step S1620, the receiving UE may determine an HARQ feedback resource. Additionally, for example, the transmitting UE may determine the HARQ feedback resource.

For example, the HARQ feedback resource may be configured to have a correlation or linkage with the PSSCH. For example, the HARQ feedback resource may include at least one of a time domain resource, a frequency domain resource, and/or a code domain resource. For example, a position of the HARQ feedback resource may be configured to have correlation or linkage with a position of a linked PSSCH resource based on a pre-defined function. For example, the HARQ feedback resource may be determined based on at least one of information on a time domain related to the PSSCH, information on a frequency domain related to the PSSCH, and/or information on a code domain related to the PSSCH.

Additionally/Alternatively, for example, the HARQ feedback resource may be configured to have a correlation or linkage with the PSCCH. For example, a position of the HARQ feedback resource may be configured to have correlation or linkage with a position of a linked PSCCH resource based on a pre-defined function. For example, the HARQ feedback resource may be determined based on at least one of information on a time domain related to the PSCCH, information on a frequency domain related to the PSCCH, and/or information on a code domain related to the PSCCH.

For example, the HARQ feedback resource may be configured in a subset format of a frequency resource that is used for PSSCH transmission and/or PSCCH transmission. For example, the frequency domain of the HARQ feedback resource may be configured in a subset format of a frequency domain of a linked PSSCH resource and/or PSCCH resource. For example, the frequency domain of the HARQ feedback resource may be included in the frequency domain of a PSSCH resource and/or PSCCH resource.

Figure 17:
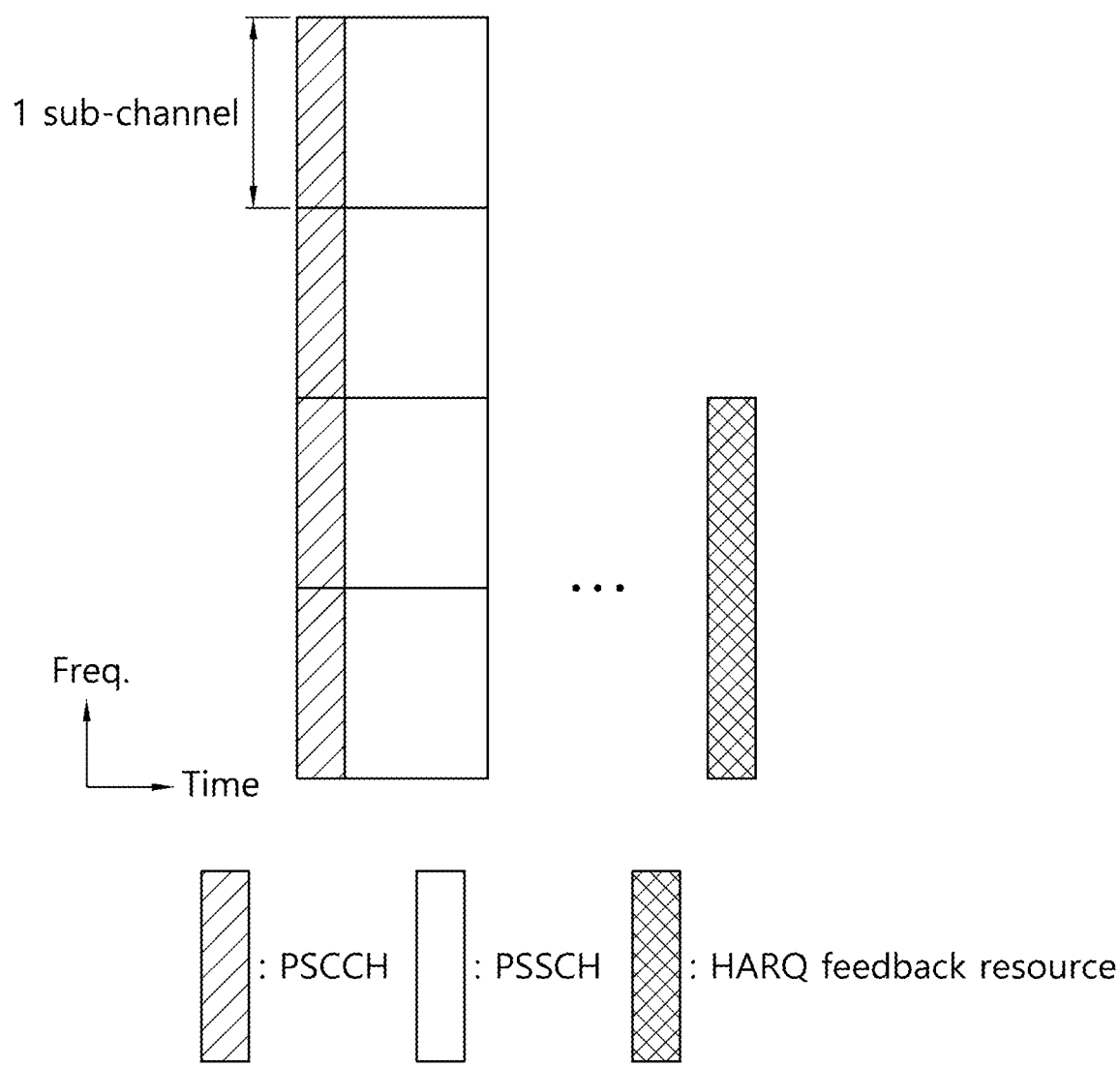
FIG. 17 shows an HARQ feedback resource, in accordance with an embodiment of the present disclosure.

FIG. 17 shows an HARQ feedback resource, in accordance with an embodiment of the present disclosure. The embodiment of FIG. 17 may be combined with other various embodiments.

Referring to FIG. 17, a transmitting UE may transmit a PSCCH and/or PSSCH to a receiving UE via 4 subchannels. In this case, the frequency domain of an HARQ feedback resource associated with the PSCCH and/or PSSCH may correspond to a subset of the frequency resource being used by the transmitting UE for transmitting a PSCCH and/or PSSCH.

According to an embodiment of the present disclosure, a time gap between an HARQ feedback resource and a PSSCH resource may be configured. Additionally/Alternatively, for example, a time gap between an HARQ feedback resource and a PSCCH resource may be configured. For example, based on the decoding capability and/or latency requirements (e.g., V2X message and/or service related latency requirements) of the UE, a time gap may be configured between a PSCCH and/or PSSCH reception point of a receiving UE and an HARQ feedback transmission point of the receiving UE. For example, based on the decoding capability and/or latency requirements of the UE, a time gap may be configured between an HARQ feedback reception point of a transmitting UE and a PSSCH and/or PSCCH (re-)transmission point of the transmitting UE.

For example, the time gap may be commonly configured in a resource pool. For example, the time gap may be commonly configured between different UEs within a resource pool. For example, the time gap may be commonly configured to the transmitting UE and the receiving UE. Therefore, the UE may simply determine the HARQ feedback. For example, the time gap may be resource pool-specifically configured.

For example, among a latency budget of services co-existing in a resource pool, the time gap may be configured or designated to have a value less than and/or equal to the smallest latency budget value. For example, in case service A and service B co-exist in the resource pool, and in case the latency budget of service A is smaller than the latency budget of service B, the time gap may be configured or designated to have a value that is less than or equal to the latency budget of service A.

For example, the time gap may be designated so that a maximum number of retransmissions related to a transport block (TB), which is specifically configured according to a resource pool, a service type, a service priority level, a cast type, and/or QoS requirements of the service, can (all) be supported/performed in a latency budget for a (related) service within the resource pool. For example, the maximum number of retransmissions may be a maximum allowable number of retransmissions including an initial transmission.

For example, among the decoding capabilities of the UE, the time gap may be configured or designated to have a value greater than and/or equal to the greatest (or largest) decoding capability value. Herein, for example, the decoding capability may be a processing time of the UE that is needed starting from a PSSCH reception end time of the UE to a PSFCH transmission start time of the UE. Additionally/Alternatively, for example, the decoding capability may be a processing time of the UE that is needed starting from a PSCCH reception end time of the UE to a PSFCH transmission start time of the UE. For example, among the decoding capabilities of the UE within a resource pool, the time gap may be configured or designated to have a value greater than and/or equal to the greatest (or largest) decoding capability value. For example, in case UE A, UE B, and UE C perform SL communication within the resource pool, and in case the decoding capability of UE A is the least favorable, the time gap may be configured or designated to have a value greater than and/or equal to the processing time that is required starting from starting from a PSSCH and/or PSCCH reception end time of UE A to a PSFCH transmission start time of UE A.

For example, the time gap may be differently or independently configured per service type, service priority level, SL communication type, a session related to the service, PPPP related to the service, PPPR related to service, a Block Error Rate (BLER) related to the service, a Signal to Interference plus Noise Ratio (SINR) related to the service, a latency budget related to the service, and/or UE capability. For example, the time gap may be differently or independently configured per service type, service priority level, SL communication type, a session related to the service, PPPP related to the service, PPPR related to service, a BLER related to the service, a SINR related to the service, a latency budget related to the service, and/or UE capability within the resource pool. For example, the SL communication type may include at least one of unicast, groupcast, and/or broadcast.

Referring back to FIG. 16, in step S1630, the receiving UE may transmit an HARQ feedback to the transmitting UE. For example, the receiving UE may transmit an HARQ feedback corresponding to the PSCCH and/or PSSCH to the transmitting UE. For example, the receiving UE may transmit the HARQ feedback to the transmitting UE by using an HARQ feedback resource, which is determined based on the PSCCH resource and/or PSSCH resource. For example, the transmitting UE may receive an HARQ feedback from the receiving UE within an HARQ feedback resource, which is determined based on the PSCCH resource and/or PSSCH resource.

For example, in case the receiving UE successfully receives the PSCCH and/or PSSCH, the HARQ feedback may be an HARQ ACK. For example, in case the receiving UE fails to receive the PSCCH and/or PSSCH, the HARQ feedback may correspond to at least one of an HARQ NACK and/or a discontinuous detection (DTX).

According to an embodiment of the present disclosure, in case of a groupcast, wherein a plurality of UEs within a group perform SL communication with one another, the HARQ feedback resource may be implemented as two different types.

(1) Option A: A common HARQ feedback resource may be configured between receiving UEs. For example, in case a transmitting UE transmits a PSSCH and/or PSCCH to a plurality of receiving UEs, the HARQ feedback resource may be commonly configured for the plurality of receiving UEs that have received the PSSCH and/or PSCCH.

(2) Option B: HARQ feedback resources each being different or independent from one another may be configured between receiving UEs. For example, HARQ feedback resources each being different or independent from one another may be configured per receiving UE or per subgroup including one or more receiving UEs. For example, in case a transmitting UE transmits a PSSCH and/or PSCCH to a plurality of receiving UEs, HARQ feedback resources each being different or independent from one another may each be configured for a plurality of receiving UEs that have received the PSSCH and/or PSCCH or for a plurality of sub-groups.

For example, Option A may be limitedly applied only to the Groupcast option 1. For example, in Groupcast option 1, a plurality of receiving UEs may transmit an HARQ NACK to the transmitting UE by using an HARQ feedback resource, which is commonly configured for the plurality of receiving UEs, only in case the plurality of receiving UEs have failed to receive the PSSCH and/or PSCCH. For example, the HARQ NACK may be implemented in a Single Frequency Network (SFN) format. In this case, the transmitting UE may not be capable of separating and receiving the HARQ NACKs transmitted from the plurality of receiving UEs. Therefore, the transmitting UE may not be capable of knowing which receiving UE has transmitted the HARQ NACK. However, the transmitting UE may know that at least one receiving UE, among the plurality of receiving UEs, has transmitted the HARQ NACK, and the transmitting UE may retransmit the PSSCH and/or PSCCH to the plurality of receiving UEs.

For example, in case of Option A, a unicast related HARQ feedback resource structure may be re-used. Additionally/Alternatively, for example, in case of Option A, an overhead related to the HARQ feedback resource may be decreased. Conversely, in case of Option A, there may be limitations in that the transmitting UE cannot determine/recognize a DTX. For example, in case the transmitting UE has transmitted the PSSCH and/or PSCCH to the receiving UE, the receiving UE may fail to receive a PSCCH, which schedules the PSSCH. In this case, according to Option A, the receiving UE may not transmit the HARQ NACK to the transmitting UE. Therefore, there may occur a problem where the transmitting UE misinterprets that the receiving UE has successfully received the PSSCH.

For example, in case of Option B, within a group including a plurality of receiving UEs, HARQ feedback resources each being different or independent from one another may be allocated per receiving UE or sub-group. Herein, for example, according to Option B, as the number of receiving UEs or the number of sub-groups included in the group becomes larger, a larger amount of HARQ feedback resources may be required. For example, in case of a group including N number of receiving UEs, N−1 number of HARQ feedback resources may be required. For example, Option B may be limitedly applied only to the Groupcast option 2.

Figure 18:
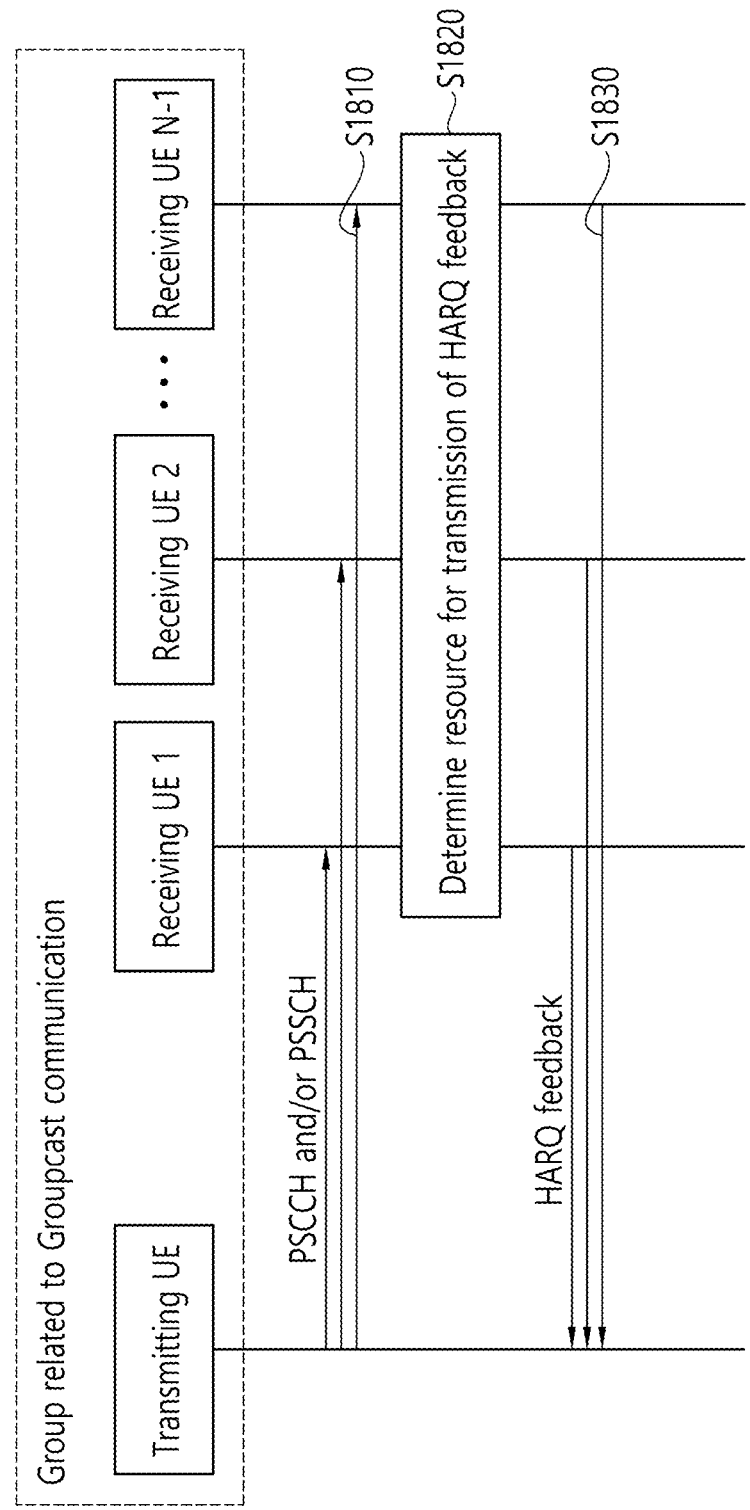
FIG. 18 shows a procedure for transmitting/receiving an HARQ feedback by a UE, in a groupcast SL communication, in accordance with an embodiment of the present disclosure.

FIG. 18 shows a procedure for transmitting/receiving an HARQ feedback by a UE, in a groupcast SL communication, in accordance with an embodiment of the present disclosure. The embodiment of FIG. 18 may be combined with other various embodiments.

In the embodiment of FIG. 18, it will be assumed that N number of UEs are included in a group. For example, the group may correspond to a group being related to groupcast SL communication. For example, the embodiment of FIG. 18 may be applied in accordance with the Option B. For example, the embodiment of FIG. 18 may be applied in accordance with the Groupcast option 2.

Referring to FIG. 18, in step S1810, a transmitting UE may transmit a PSCCH and/or PSSCH to a plurality of receiving UEs. For example, the transmitting UE may transmit SL information to the plurality of receiving UEs by using a PSCCH resource and/or a PSSCH resource. For example, the SL information may include at least one of SL control information, SL data, SL packet, SL Transport Block (TB), SL message and/or SL service.

In step S1820, the plurality of receiving UEs may determine an HARQ feedback resource. Additionally, for example, the transmitting UE may determine the HARQ feedback resource.

For example, in case the group is generated, an identifier (hereinafter, GUE_ID) being used within the group may be allocated per UE. in case the group is generated, a GUE_ID may be allocated per sub-group. For example, the GUE_ID may be generated by a specific UE and may then be delivered to the UEs within the group. For example, the specific UE may be a Group Owner (GO). For example, the GUE_ID may be configured by the network or base station, or may be configured in advance (or pre-configured). For example, the GUE_ID may be differently allocated for each of the plurality of UEs within the group. For example, the GUE_ID may be differently allocated for each of the plurality of sub-groups within the group.

For example, the plurality of receiving UEs may each determine an HARQ feedback resource based on its GUE_ID. For example, receiving UE 1 may determine the HARQ feedback resource by using the GUE_ID that is allocated to receiving UE 1, receiving UE 2 may determine the HARQ feedback resource by using the GUE_ID that is allocated to receiving UE 2, and receiving UE N−1 may determine the HARQ feedback resource by using the GUE_ID that is allocated to receiving UE N−1. Therefore, the HARQ feedback resource may be differently determined for each of the plurality of receiving UEs within the group.

For example, the remaining UEs (e.g., receiving UEs) excluding the transmitting UE may sequentially use the plurality of HARQ feedback resources (e.g., N−1 number of HARQ feedback resources) in accordance with an increasing order of the GUE_ID. For example, the remaining UEs (e.g., receiving UEs) excluding the transmitting UE may sequentially use the plurality of HARQ feedback resources (e.g., N−1 number of HARQ feedback resources) in accordance with a decreasing order of the GUE_ID. For example, the remaining UEs (e.g., receiving UEs) excluding the transmitting UE may sequentially use the plurality of HARQ feedback resources (e.g., N−1 number of HARQ feedback resources) in accordance with an order of the GUE_ID that is derived based on a pre-configured function/rule. For example, the plurality of HARQ feedback resources may be configured in advance (or pre-configured). For example, the transmitting UE may correspond to a UE that has transmitted the PSSCH and/or PSCCH to the plurality of receiving UEs.

For example, the remaining sub-groups excluding the transmitting UE may sequentially use the plurality of HARQ feedback resources in accordance with an increasing order of the GUE_ID. For example, the remaining sub-groups excluding the transmitting UE may sequentially use the plurality of HARQ feedback resources in accordance with a decreasing order of the GUE_ID. For example, the remaining sub-groups excluding the transmitting UE may sequentially use the plurality of HARQ feedback resources in accordance with an order of the GUE_ID that is derived based on a pre-configured function/rule. For example, the plurality of HARQ feedback resources may be configured in advance (or pre-configured). For example, the transmitting UE may correspond to a UE that has transmitted the PSSCH and/or PSCCH to the plurality of receiving UEs.

In step S1830, the plurality of receiving UEs may each transmit an HARQ feedback to the transmitting UE. For example, the plurality of receiving UEs may each transmit an HARQ feedback corresponding to the PSCCH and/or PSSCH to the transmitting UE. For example, the plurality of receiving UEs may each transmit the HARQ feedback to the transmitting UE by using an HARQ feedback resource, which is determined based on the PSCCH resource and/or PSSCH resource.

For example, in case the receiving UE successfully receives the PSCCH and/or PSSCH, the HARQ feedback may be an HARQ ACK. For example, in case the receiving UE fails to receive the PSCCH and/or PSSCH, the HARQ feedback may be at least one of an HARQ NACK and/or a discontinuous detection (DTX).

According to an embodiment of the present disclosure, in order to reduce an HARQ Round Trip Time (RTT), the HARQ feedback resource may become an FDM between UEs or sub-groups within the group. Herein, for example, in light of a transmitting UE receiving an HARQ feedback from a receiving UE, in order to mitigate a Near-Far problem caused by in-band emission, power control associated with the HARQ feedback transmission may be required. For example, in light of a PSSCH and/or PSCCH transmitting UE receiving an HARQ feedback from a receiving UE, in order to mitigate a Near-Far problem caused by in-band emission, power control associated with the HARQ feedback transmission corresponding to the receiving UE may be required.

According to an embodiment of the present disclosure, the UE may determine an HARQ feedback transmission power based on at least one of an SL pathloss value derived/acquired based on a reference signal within an SL channel, an SL RSRP value derived/acquired based on a reference signal within an SL channel, a SL RSRQ value derived/acquired based on a reference signal within an SL channel, an open-loop power control parameter, and/or a closed-loop power control parameter. For example, in case the transmitting UE transmits a reference signal to the receiving UE via an SL channel, the receiving UE may determine an HARQ feedback transmission power based on at least one of an SL pathloss value derived/acquired based on a reference signal within an SL channel, an SL RSRP value derived/acquired based on a reference signal within an SL channel, a SL RSRQ value derived/acquired based on a reference signal within an SL channel, an open-loop power control parameter, and/or a closed-loop power control parameter.

For example, a reference signal within the SL channel may be defined in advance. For example, a reference signal within the SL channel may be a DMRS being transmitted within the PSSCH (i.e., PSSCH DMRS) or a DMRS being transmitted within the PSCCH (i.e., PSCCH DMRS). For example, a reference signal within the SL channel may be a CSI-RS being transmitted within a PSSCH. For example, a reference signal within the SL channel may be a reference signal being used for quality estimation (e.g., CQI, PMI, RI) of the SL channel. For example, a reference signal within the SL channel may be a reference signal being used for the measurement of at least one of an SL pathloss value, an SL RSRP value, and/or an SL RSRQ value.

For example, the SL pathloss may be a pathloss corresponding to a link between a transmitting UE and a receiving UE. For example, an open-loop power control parameter and/or a closed-loop power control parameter may be configured in advance. For example, an open-loop power control parameter may include a Po and/or alpha value.

For example, Po may be a power control parameter for averagely satisfying a target error rate (e.g., Block Error Rate (BLER), Frame Error Rate (FER)) related to packet/message transmission. Additionally/Alternatively, for example, Po may be a power control parameter related to an average reception SINR between a transmitting UE and a receiving UE. For example, Po may be a power control parameter that is specified to a UE, a resource pool, a service type, a service priority level, QoS requirements related to a service, a (frequency) resource size being used for SL transmission, an MCS value being used for SL transmission, a congestion level (e.g., CBR) related to the resource pool, and/or a cast type. For example, in case the HARQ feedback transmission power is calculated/derived based on an SL RSRP and/or SL RSRQ value/range, a different Po value/range may be mapped/configured per (pre-configured) SL RSRP and/or SL RSRQ value/range.

For example, in case the HARQ feedback transmission power is calculated/derived based on an SL pathloss, an alpha value may be a weighted value being applied to (measured) pathloss compensation. Additionally/Alternatively, for example, in case the HARQ feedback transmission power is calculated/derived based on an SL RSRP and/or SL RSRQ value/range, an alpha value may be a weighted value being applied to a/an (measured) SL RSRP and/or SL RSRQ value/range. Additionally/Alternatively, for example, in case the HARQ feedback transmission power is calculated/derived based on an SL RSRP and/or SL RSRQ value/range, an alpha value may be a weighted value being applied to an HARQ feedback transmission power being mapped/configured per (measured) SL RSRP and/or SL RSRQ value/range. Herein, for example, an alpha value/range may be specifically configured for a UE, a resource pool, a service type, a service priority level, QoS requirements related to a service, a (frequency) resource size being used for SL transmission, an MCS value being used for SL transmission, a congestion level (e.g., CBR) related to the resource pool, and/or a cast type. For example, in case the HARQ feedback transmission power is calculated/derived based on an SL RSRP and/or SL RSRQ value/range, a different alpha value/range may be mapped/configured per (pre-configured) SL RSRP and/or SL RSRQ value/range.

For example, in case the HARQ feedback transmission power is calculated/derived based on an SL RSRP and/or SL RSRQ value/range, a different offset value/range may be mapped/configured per (pre-configured) SL RSRP and/or SL RSRQ value/range. A UE that has measured the SL RSRP and/or SL RSRQ may apply the offset related to the SL RSRP value and/or SL RSRQ value to a (pre-configured normalized or nominal) (maximum) SL (HARQ feedback) transmission power, so as to determine a final HARQ feedback transmission power. Herein, for example, the offset value/range may be specifically configured for a UE, a resource pool, a service type, a service priority level, QoS requirements related to a service, a (frequency) resource size being used for SL transmission, an MCS value being used for SL transmission, a congestion level (e.g., CBR) related to the resource pool, and/or a cast type.

For example, a different (normalized or nominal) (maximum) SL HARQ feedback transmission power may be mapped/configured per (pre-configured) SL RSRP and/or SL RSRQ value/range. For example, a (normalized or nominal) (maximum) SL HARQ feedback transmission power value/range may be specifically configured for a UE, a resource pool, a service type, a service priority level, QoS requirements related to a service, a (frequency) resource size being used for SL transmission, an MCS value being used for SL transmission, a congestion level (e.g., CBR) related to the resource pool, and/or a cast type.

For example, the reference signal and/or transmission power value related to an SL channel including the reference signal may be signaled to a UE via a pre-defined channel. For example, the reference signal and/or transmission power value related to an SL channel including the reference signal may be transmitted to a receiving UE via a pre-defined channel. For example, the pre-defined channel may correspond to a PSCCH. For example, the receiving UE may correspond to a UE measuring at least one of an SL pathloss, an SL RSRP, and/or an SL RSRQ based on the reference signal.

For example, the open-loop power control parameter (and/or (maximum or minimum) HARQ feedback transmission power value being mapped/configured per SL RSRP (and/or SL RSRQ) value/range) may be differently or independently configured per service type, service priority level, SL communication type (e.g., unicast, groupcast, broadcast), (resource pool related) congestion level (e.g., Channel Busy Ratio (CBR)), session related to the service, PPPP related to the service, PPPR related to the service, Block Error Rate (BLER) related to the service, target Signal to Interference plus Noise Ratio (SINR) related to the service, (minimum or maximum) target communication distance related to the service, and/or latency budget related to the service. Additionally/Alternatively, for example, a closed-loop transmission power control operation/parameter may be differently or independently configured per service type, service priority level, SL communication type (e.g., unicast, groupcast, broadcast), (resource pool related) congestion level (e.g., CBR), session related to the service, PPPP related to the service, PPPR related to the service, Block Error Rate (BLER) related to the service, target Signal to Interference plus Noise Ratio (SINR) related to the service, (minimum or maximum) target communication distance related to the service, and/or latency budget related to the service.

For example, an open-loop transmission power control parameter related to the HARQ feedback may be differently or independently configured from the open-loop transmission power control parameter related to the PSSCH and/or PSCCH. Additionally/Alternatively, for example, a closed-loop transmission power control operation/parameter related to the HARQ feedback may be differently or independently operated/configured from the closed-loop transmission power control operation/parameter related to the PSSCH and/or PSCCH.

According to an embodiment of the present disclosure, an FDM of an HARQ resource may be authorized (or allowed) or configured only for receiving UEs having a distance from the transmitting UE, which receives the HARQ feedback, within a pre-determined threshold value. Additionally/Alternatively, for example, an FDM of an HARQ resource may be authorized (or allowed) or configured only for receiving UEs having an SL pathloss difference corresponding to a link between the transmitting UE and the receiving UE within a predetermined threshold value. Additionally/Alternatively, for example, an FDM of an HARQ resource may be authorized (or allowed) or configured only for receiving UEs having an SL RSRP difference corresponding to a link between the transmitting UE and the receiving UE within a predetermined threshold value. Additionally/Alternatively, for example, an FDM of an HARQ resource may be authorized (or allowed) or configured only for receiving UEs having an SL RSRQ difference corresponding to a link between the transmitting UE and the receiving UE within a predetermined threshold value.

For example, if a distance between each of the plurality of receiving UEs and the transmitting UE is within a pre-determined threshold value, the plurality of receiving UEs may transmit an HARQ feedback via a resource processed with FDM within the frequency axis. Additionally/Alternatively, for example, if a pathloss difference between each of the plurality of receiving UEs and the transmitting UE is within a pre-determined threshold value, the plurality of receiving UEs may transmit an HARQ feedback via a resource processed with FDM within the frequency axis. Additionally/Alternatively, for example, if a (measured) RSRP value difference between each of the plurality of receiving UEs and the transmitting UE is within a pre-determined threshold value, the plurality of receiving UEs may transmit an HARQ feedback via a resource processed with FDM within the frequency axis. Additionally/Alternatively, for example, if a (measured) RSRQ value difference between each of the plurality of receiving UEs and the transmitting UE is within a pre-determined threshold value, the plurality of receiving UEs may transmit an HARQ feedback via a resource processed with FDM within the frequency axis.

For example, it may not be preferable to process an HARQ feedback resource with FDM among UEs or sub-groups within a group. For example, in case power control related to HARQ feedback transmission is not applied, it may not be preferable to process an HARQ feedback resource with FDM among different UEs or different sub-groups within a group. For example, in case an HARQ feedback reception power difference among different UEs or different sub-groups within a group is greater than a pre-determined threshold value, it may not be preferable to process an HARQ feedback resource with FDM among different UEs or different sub-groups within the group. For example, in case an SL pathloss difference among different UEs or different sub-groups within a group is greater than a pre-determined threshold value, it may not be preferable to process an HARQ feedback resource with FDM among different UEs or different sub-groups within the group. For example, in case an SL RSRP difference among different UEs or different sub-groups within a group is greater than a pre-determined threshold value, it may not be preferable to process an HARQ feedback resource with FDM among different UEs or different sub-groups within the group. For example, in case an SL RSRQ difference among different UEs or different sub-groups within a group is greater than a pre-determined threshold value, it may not be preferable to process an HARQ feedback resource with FDM among different UEs or different sub-groups within the group.

For example, as mentioned in the above-described example, in case it is not preferable to process the HARQ feedback resource with FDM, the HARQ feedback resource may be pseudo-randomly processed with FDM based on at least one of a GUE_ID, an identifier related to a receiving UE, an SL HARQ process ID, and/or an identifier related to a transmitting UE. For example, the HARQ feedback resource may be pseudo-randomly determined based on at least one of a GUE_ID, an identifier related to a receiving UE, an SL HARQ process ID, and/or an identifier related to a transmitting UE. For example, the HARQ feedback resource may be processed with TDM or determined by a function having at least one of a GUE_ID, an identifier related to a receiving UE, an SL HARQ process ID, and/or an identifier related to a transmitting UE as an input parameter. For example, the HARQ feedback resource may be a HARQ feedback resource for each of a plurality of receiving UEs within the group. For example, the HARQ feedback resource may be a HARQ feedback resource for each sub-group within the group. For example, the identifier related to the receiving UE may correspond to a destination ID. For example, the identifier related to the transmitting UE may be a source ID. For example, the function may be pre-defined in advance.

Figure 19:
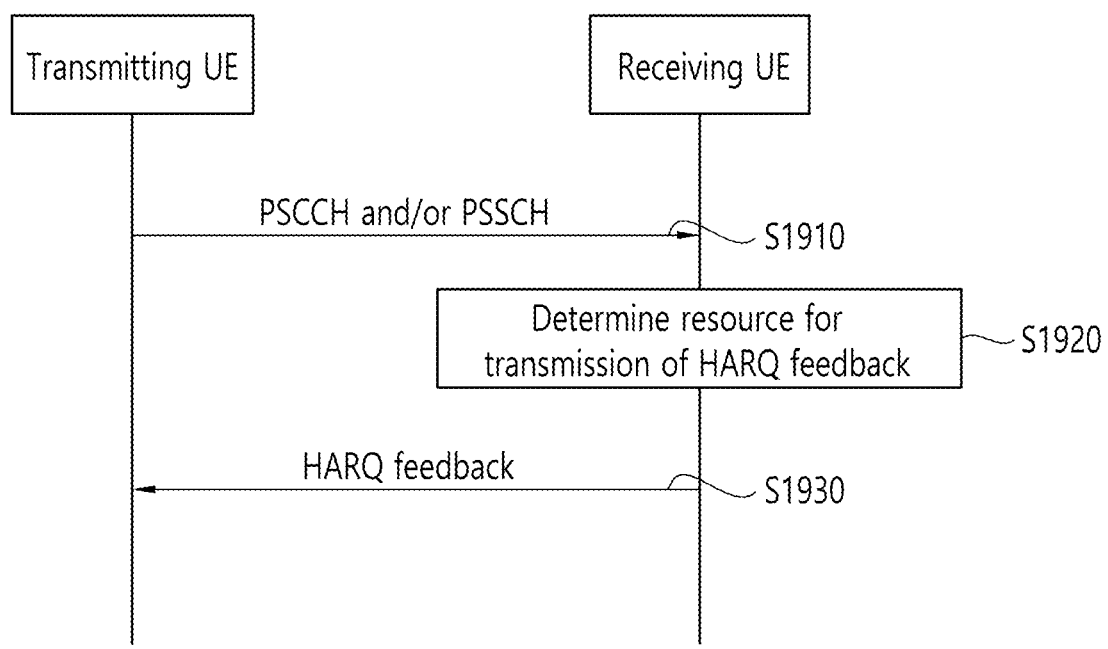
FIG. 19 shows a procedure for transmitting/receiving an HARQ feedback by a UE, in accordance with an embodiment of the present disclosure.

FIG. 19 shows a procedure for transmitting/receiving an HARQ feedback by a UE, in accordance with an embodiment of the present disclosure. The embodiment of FIG. 19 may be combined with other various embodiments.

Referring to FIG. 19, in step S1910, a transmitting UE may transmit a PSCCH and/or PSSCH to a receiving UE. For example, the transmitting UE may transmit SL information to the receiving UE by using a PSCCH resource and/or a PSSCH resource. For example, the SL information may include at least one of SL control information, SL data, SL packet, SL Transport Block (TB), SL message and/or SL service.

In step S1920, the receiving UE may determine an HARQ feedback resource. Additionally, for example, the transmitting UE may determine the HARQ feedback resource. For example, the receiving UE may be one of a plurality of receiving UEs performing groupcast communication within a group.

For example, the HARQ feedback resource may be determined based on at least one of the PSCCH resource, the PSSCH resource, and/or GUE_ID. For example, in case each of the plurality of receiving UEs within a group feeds-back an HARQ ACK or HARQ NACK to the transmitting UE by using a different PSFCH resource, the plurality of receiving UEs within the group may determine the HARQ feedback resource by using the GUE_ID. For example, the resource may include at least one of a time domain resource, a frequency domain resource, and/or a code domain resource. For example, the GUE_ID may correspond to information for identifying a UE within the group.

In step S1930, the receiving UE may transmit an HARQ feedback to the transmitting UE. For example, the receiving UE may transmit an HARQ feedback corresponding to the PSCCH and/or PSSCH to the transmitting UE. For example, the receiving UE may transmit the HARQ feedback to the transmitting UE by using an HARQ feedback resource, which is determined based on at least one of the PSCCH resource, the PSSCH resource, and/or the GUE_ID.

For example, in case the receiving UE successfully receives the PSCCH and/or PSSCH, the HARQ feedback may be an HARQ ACK. For example, in case the receiving UE fails to receive the PSCCH and/or PSSCH, the HARQ feedback may be at least one of an HARQ NACK and/or a discontinuous detection (DTX).

According to the various embodiments of the present disclosure, in case a transmitting UE selects a PSSCH and/or PSCCH transmission resource by performing a sensing operation, a problem of collision between HARQ feedback transmission related resources may not occur. For example, in case each of a plurality of transmitting UEs selects a different PSSCH and/or PSCCH transmission resource by performing a sensing operation, the HARQ feedback resource may be determined based on a PSSCH resource and/or PSCCH resource. Therefore, among the UEs each having selected a different PSSCH and/or PSCCH transmission resource based on the sensing operation, a collision between the HARQ feedback resources may be automatically avoided.

According to the various embodiments of the present disclosure, in case the transmitting UE transmits the same PSSCH and/or PSCCH to a plurality of receiving UEs within the group, each of the plurality of receiving UEs may determine an HARQ feedback resource by using a different GUE_ID. Therefore, even though the plurality of receiving UEs within the group have received the same PSSCH and/or PSCCH, collision between the HARQ feedback resources may be prevented.

Figure 20:
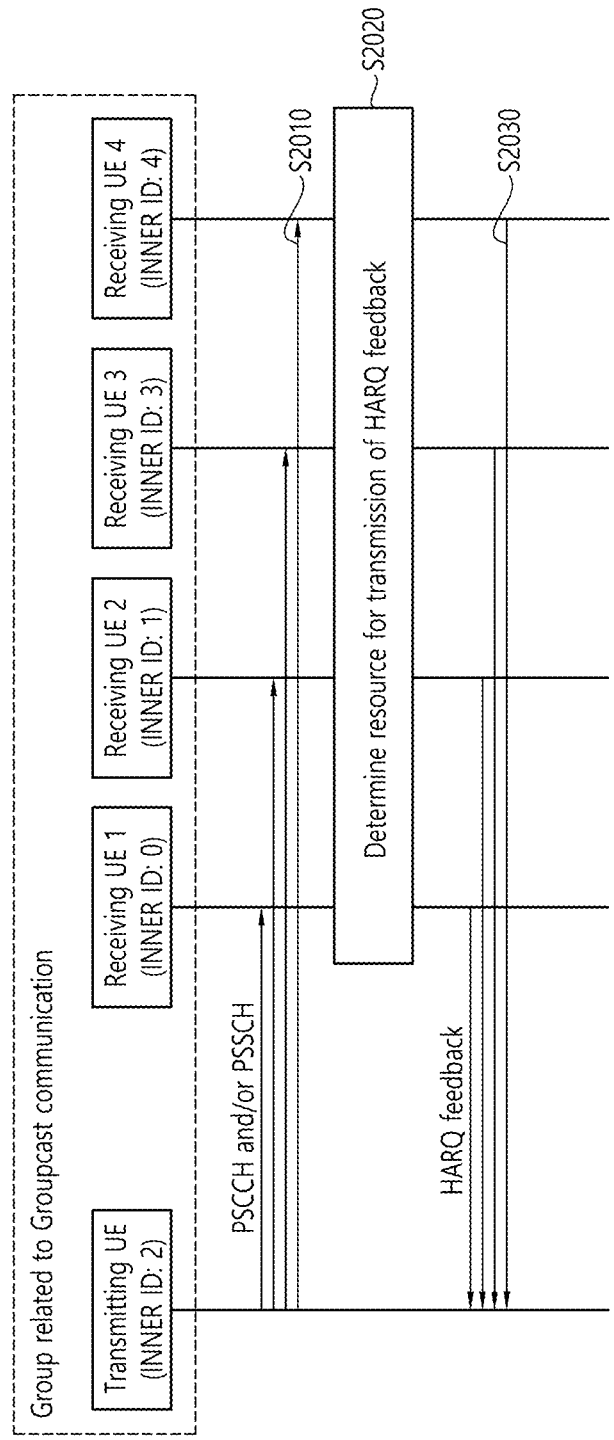
FIG. 20 shows a procedure for transmitting/receiving an HARQ feedback by a UE, in accordance with an embodiment of the present disclosure.

FIG. 20 shows a procedure for transmitting/receiving an HARQ feedback by a UE, in accordance with an embodiment of the present disclosure. The embodiment of FIG. 20 may be combined with other various embodiments.

For example, an ID for identifying a UE within a group may be assigned (or allocated)/designated to each of the plurality of UEs within a group. For example, the ID may be referred to as an inner ID. For example, the inner ID may be the same purpose or parameter as the GUE_ID. For example, for a specific groupcast traffic, an application layer may deliver information on an inner ID of a UE and information on a number of UEs within a group to a V2X layer. For example, the UE may be a UE transmitting the specific groupcast traffic. For example, for a specific groupcast traffic, the application layer may not transmit information on an inner ID of a different UE within the group to the V2X layer. For example, the groupcast traffic may include at least one of a groupcast service, groupcast data, a groupcast packet, and/or a groupcast message.

For example, in an embodiment of FIG. 20, in case a transmitting UE intends to transmit a first traffic related to groupcast to a plurality of receiving UEs within a group, an application layer of the transmitting UE may deliver information on an inner ID (e.g., ID=2) of the transmitting UE and information on a number of UEs (e.g., 5) within the group to a V2X layer of the transmitting UE. For example, an application layer of receiving UE 1 may deliver information on an inner ID (e.g., ID=0) of the receiving UE 1 and information on a number of UEs (e.g., 5) within the group to a V2X layer of the receiving UE 1. For example, an application layer of receiving UE 2 may deliver information on an inner ID (e.g., ID=1) of the receiving UE 2 and information on a number of UEs (e.g., 5) within the group to a V2X layer of the receiving UE 2. For example, an application layer of receiving UE 3 may deliver information on an inner ID (e.g., ID=3) of the receiving UE 3 and information on a number of UEs (e.g., 5) within the group to a V2X layer of the receiving UE 3. For example, an application layer of receiving UE 4 may deliver information on an inner ID (e.g., ID=4) of the receiving UE 4 and information on a number of UEs (e.g., 5) within the group to a V2X layer of the receiving UE 4.

And, for example, a V2X layer of a UE may deliver information on an inner ID of the UE and information on a number of UEs within the group to a V2X layer of the UE. Additionally, for example, a V2X layer of a UE may collectively deliver L2 ID (e.g., source L2 ID, destination L2 ID) and/or QoS information, and so on, to an AS layer of the UE.

Referring to FIG. 20, in step S2010, a transmitting UE may transmit a specific groupcast traffic to a plurality of receiving UEs. For example, the specific groupcast traffic may be transmitted via PSSCH and/or PSCCH.

In step S2020, the plurality of receiving UEs may determine an HARQ feedback resource. For example, each of the plurality of receiving UEs (e.g., an AS layer of each of the plurality of receiving UEs) may determine the HARQ feedback resource for a specific groupcast traffic based on information on its inner ID and information on the number of UEs within the group in accordance with a pre-defined rule.

For example, the transmitting UE may determine the HARQ feedback resource (it is intended to receive). For example, the transmitting UE may derive or determine HARQ feedback resources of the plurality of receiving UEs related to a specific groupcast traffic, based on information on the inner ID of each receiving UE and information on the number of UEs within the group.

For example, when an application layer provides information on inner IDs of UEs and information on a number of UEs within the group to a V2X layer of the UE, the UE may determine or view one of the Groupcast option 1 or the Groupcast option 2 as a (selectable) HARQ feedback option for the specific groupcast traffic. For example, the V2X layer of the UE may determine or view one of the Groupcast option 1 or the Groupcast option 2 as a (selectable) HARQ feedback option for the specific groupcast traffic. Additionally, depending upon whether or not pre-determined conditions are satisfied, the UE may finally determine or view one of the Groupcast option 1 and the Groupcast option 2 as an HARQ feedback option for the specific groupcast traffic. For example, in case the HARQ feedback resources for each of a plurality of UEs participating (or being engaged) in the groupcast are all supported in the resource pool, the UE may finally determine or view the Groupcast option 2 as the HARQ feedback option for the specific groupcast traffic. For example, in case the HARQ feedback resources for each of a plurality of UEs participating (or being engaged) in the groupcast are not all supported in the resource pool, the UE may finally determine or view the Groupcast option 1 as the HARQ feedback option for the specific groupcast traffic. For example, the determination (or decision) may be performed in the AS layer of the UE.

For example, if an application layer does not provide the information on the number of UEs within the group to a V2X layer of the UE, the UE may determine or view the Groupcast option 1 as the HARQ feedback option for the specific groupcast traffic. For example, if an application layer does not provide the information on the inner IDs of the UEs and/or information on the number of UEs within the group to a V2X layer of the UE, the UE may determine or view the Groupcast option 1 as the HARQ feedback option for the specific groupcast traffic. For example, the V2X layer of the UE may determine or view the Groupcast option 1 as the HARQ feedback option for the specific groupcast traffic.

For example, if the application layer and/or the V2X layer provide(s) information on the inner IDs of the UEs and information on the number of UEs within the group to an AS layer of the UE, the UE may determine or view one of the Groupcast option 1 and the Groupcast option 2 as a/an (selectable) HARQ feedback option for the specific groupcast traffic. For example, the AS layer of the UE may determine or view one of the Groupcast option 1 and the Groupcast option 2 as a/an (selectable) HARQ feedback option for the specific groupcast traffic. Additionally, for example, depending upon whether or not pre-determined conditions are satisfied, the UE may finally determine or view one of the Groupcast option 1 and the Groupcast option 2 as an HARQ feedback option for the specific groupcast traffic. For example, in case the HARQ feedback resources for each of a plurality of UEs participating (or being engaged) in the groupcast are all supported in the resource pool, the UE may finally determine or view the Groupcast option 2 as the HARQ feedback option for the specific groupcast traffic. For example, in case the HARQ feedback resources for each of a plurality of UEs participating (or being engaged) in the groupcast are not all supported in the resource pool, the UE may finally determine or view the Groupcast option 1 as the HARQ feedback option for the specific groupcast traffic. For example, the determination (or decision) may be performed in the AS layer of the UE.

For example, if an application layer and/or V2X layer do/does not provide the information on the number of UEs within the group to an AS layer of the UE, the UE may determine or view the Groupcast option 1 as the HARQ feedback option for the specific groupcast traffic. For example, if an application layer and/or V2X layer do/does not provide the information on the inner IDs of the UEs and/or information on the number of UEs within the group to an AS layer of the UE, the UE may determine or view the Groupcast option 1 as the HARQ feedback option for the specific groupcast traffic. For example, the AS layer of the UE may determine or view the Groupcast option 1 as the HARQ feedback option for the specific groupcast traffic.

For example, whether or not at least one of the Groupcast option 1 and the Groupcast option 2 is supported may be, resource pool-specifically, signaled for a UE. For example, whether or not at least one of the Groupcast option 1 and the Groupcast option 2 is supported may be, resource pool-specifically, signaled for a UE per service type, cast type, or QoS requirement. For example, whether or not a PSFCH resource related to the Groupcast option 1 is configured may be, resource pool-specifically, signaled for a UE per service type, cast type, or QoS requirement. For example, whether or not a PSFCH resource related to the Groupcast option 2 is configured may be, resource pool-specifically, signaled for a UE per service type, cast type, or QoS requirement.

In step S2030, the transmitting UE may receive an HARQ feedback from the plurality of receiving UEs. For example, the transmitting UE may receive a Groupcast option 1 based HARQ feedback from the plurality of receiving UEs. For example, the transmitting UE may receive a Groupcast option 2 based HARQ feedback from the plurality of receiving UEs.

For example, a specific groupcast option based HARQ feedback operation may be required for a specific groupcast traffic. For example, in case the reliability requirement related to the service is high, if the transmitting UE transmits the corresponding service to the receiving UE, the receiving UE is required to perform a Groupcast option 2 based HARQ feedback operation. If the receiving UE performs a Groupcast option 1 based HARQ feedback operation for the service, a DTX problem may occur. Therefore, the receiving UE is required to perform a Groupcast option 2 based HARQ feedback operation for a service having a high reliability requirement. For example, the DTX problem may be a problem where the transmitting UE misinterprets that the receiving UE has successfully received the PSCCH and PSSCH, while the receiving UE has actually failed to receive the PSCCH and does not transmit a NACK to the transmitting UE. For example, due to the DTX problem, it may be difficult to satisfy the reliability requirement of the service. Therefore, in case a specific groupcast option is not supported in the resource pool, for example, in case a specific groupcast option is not supported for the corresponding traffic and/or service, the transmitting UE may perform a blind re-transmission operation. For example, if a PSFCH resource related to a specific groupcast option is not configured, the transmitting UE may perform a blind re-transmission operation. For example, the transmitting UE may perform re-transmission without receiving the HARQ feedback from the receiving UE.

According to the various embodiments of the present disclosure, reliability in the SL HARQ feedback transmission may be enhanced, latency in the SL service may be reduced, and/or reliability in the SL service may be enhanced.

Figure 21:
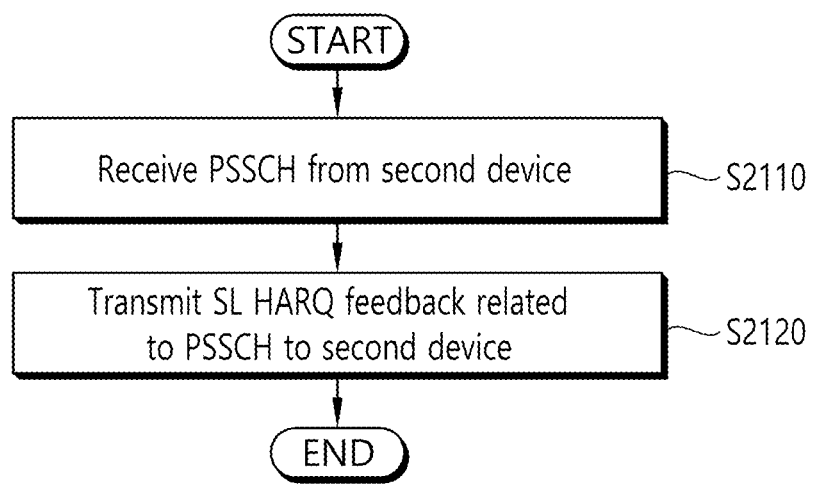
FIG. 21 shows a method for transmitting an SL HARQ feedback by a first device 100, in accordance with an embodiment of the present disclosure.

FIG. 21 shows a method for transmitting an SL HARQ feedback by a first device 100, in accordance with an embodiment of the present disclosure. The embodiment of FIG. 21 may be combined with other various embodiments.

Referring to FIG. 21, in step S2110, a first device 100 may receive a Physical Sidelink Shared Channel (PSSCH) from a second device 200.

In step S2120, the first device 100 may transmit an SL HARQ feedback related to the PSSCH to the second device 200. For example, a resource in which the SL HARQ feedback is transmitted may be determined based on an identifier (ID) of the first device 100. For example, the ID of the first device 100 may be an ID for identifying the first device 100 among the plurality of UEs performing groupcast communication within the group. For example, the IDs of the plurality of UEs may be different within the group.

For example, the resource in which the SL HARQ feedback is transmitted may be determined based on the information related to the PSSCH. For example, the information on the resource related to the PSSCH may include at least one of information on a time related to the PSSCH and information on a frequency related to the PSSCH.

Additionally, the first device 100 may receive a Physical Sidelink Control Channel (PSCCH) from the second device 200. For example, a resource in which the SL HARQ feedback is being transmitted may be determined based on information on a resource related to the PSCCH. For example, the information on the resource related to the PSCCH may include at least one of information on a time related to the PSCCH and information on a frequency related to the PSCCH.

For example, a time gap between a resource related to the PSSCH and a resource in which the SL HARQ feedback is transmitted may be configured for the first device 100 and the second device 200.

For example, the resource in which the SL HARQ feedback is transmitted may be included in a frequency domain related to the PSSCH.

Additionally, the first device 100 may measure a channel status between the first device 100 and the second device 200 based on a DMRS included in the PSSCH, and the first device 100 may determine a transmission power of the SL HARQ feedback based on the channel status. For example, the transmission power of the SL HARQ feedback may be determined based on at least one of a service type, a service priority level, an SL communication type, a session related to the service, ProSe Per Packet Priority (PPPP) related to the service, ProSe Per Packet Reliability (PPPR) related to the service, Block Error Rate (BLER) related to the service, Signal to Interference plus Noise Ratio (SINR) related to the service, or a latency budget related to the service.

The proposed method may be performed by a device according to the various embodiments of the present disclosure. Firstly, a processor 102 of the first device 100 may control a transceiver 106 so that the first device 100 can receive the Physical Sidelink Shared Channel (PSSCH) from the second device 200. Thereafter, the processor 102 of the first device 100 may control the transceiver 106 so that the first device 100 can transmit an SL HARQ feedback related to the PSSCH to the second device 200.

Figure 22:
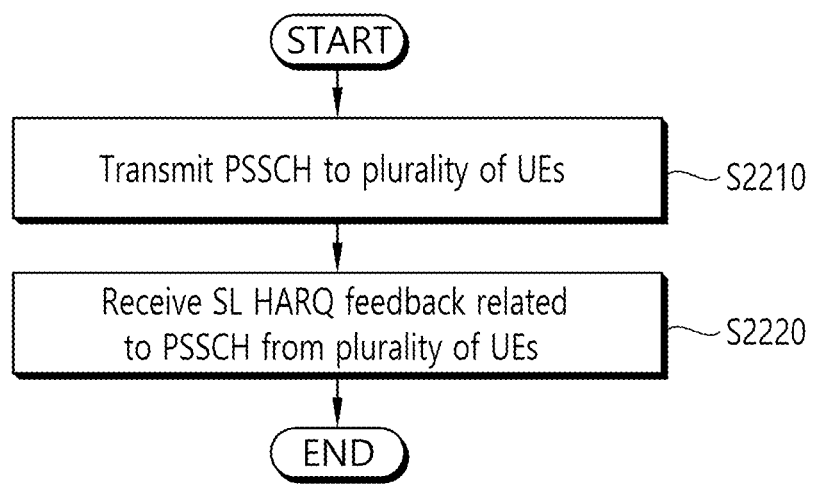
FIG. 22 shows a method for receiving an SL HARQ feedback by a second device 200, in accordance with an embodiment of the present disclosure.

FIG. 22 shows a method for receiving an SL HARQ feedback by a second device 200, in accordance with an embodiment of the present disclosure. The embodiment of FIG. 22 may be combined with other various embodiments.

Referring to FIG. 22, in step S2210, the second device 200 may transmit a Physical Sidelink Shared Channel (PSSCH) to a plurality of UEs within the group.

In step S2220, the second device 200 may receive an SL HARQ feedback related to the PSSCH from the plurality of UEs. For example, the resource in which the SL HARQ feedback is received may be determined based on identifiers (IDs) of the plurality of UEs. For example, the IDs of the plurality of UEs may be different within the group. For example, the SL HARQ feedback may be received from the plurality of UEs within the group on different resources.

The proposed method may be performed by a device according to the various embodiments of the present disclosure. Firstly, a processor 202 of the second device 200 may control a transceiver 206 so that the second device 200 can transmit the Physical Sidelink Shared Channel (PSSCH) to a plurality of UEs within the group. Thereafter, the processor 202 of the second device 200 may control the transceiver 206 so that the second device 200 can receive SL HARQ feedback related to the PSSCH from the plurality of UEs.

Various embodiments of the present disclosure may be independently implemented. Alternatively, various embodiments of the present disclosure may be implemented as a combination or integration of two or more of the embodiments. For example, although the various embodiments of the present disclosure are described based on a 3GPP system for simplicity, the various embodiments of the present disclosure may also be extendedly applied to other systems apart from the 3GPP system.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
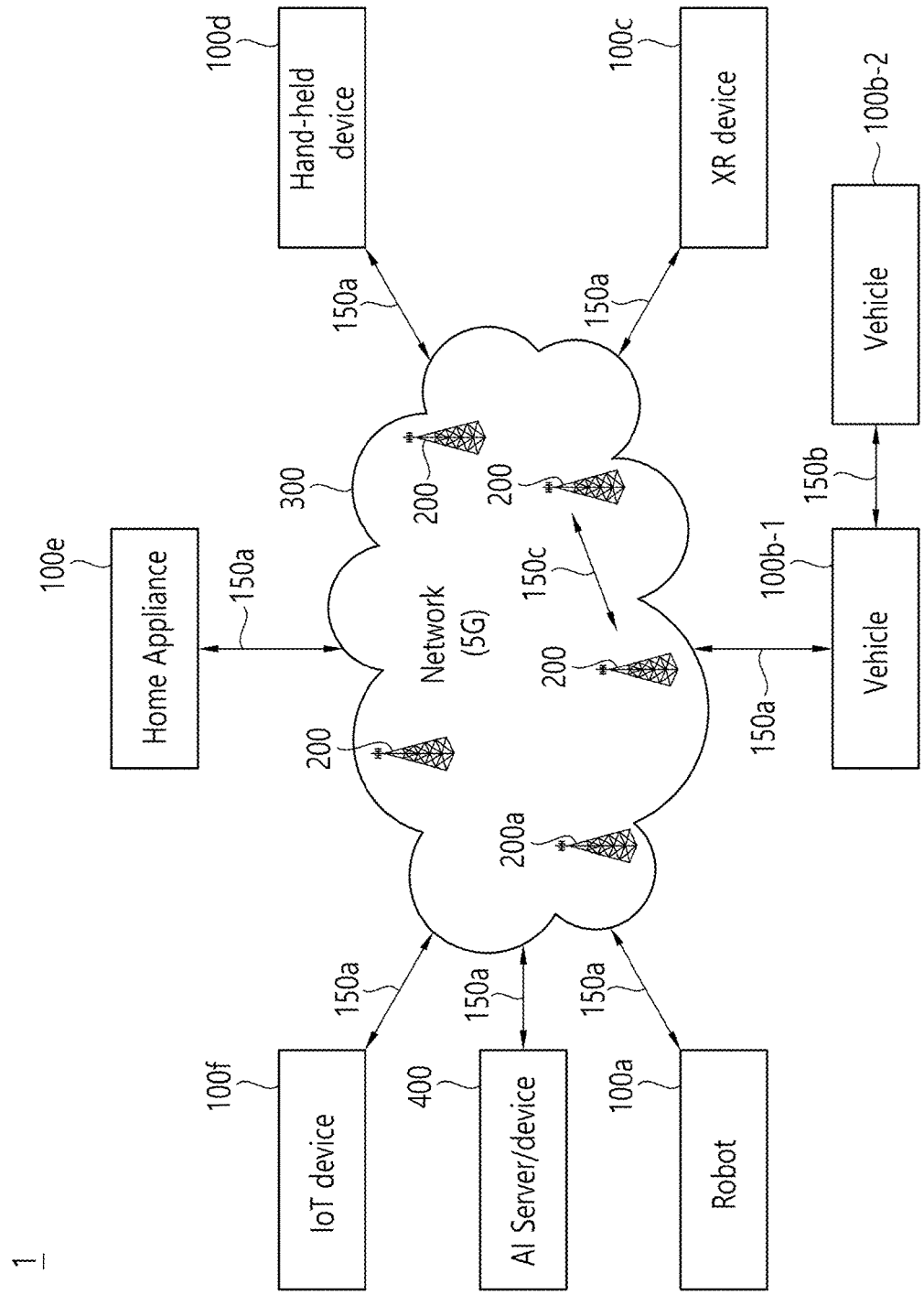
FIG. 23 shows a communication system 1, in accordance with an embodiment of the present disclosure.

FIG. 23 shows a communication system 1, in accordance with an embodiment of the present disclosure.

Referring to FIG. 23, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
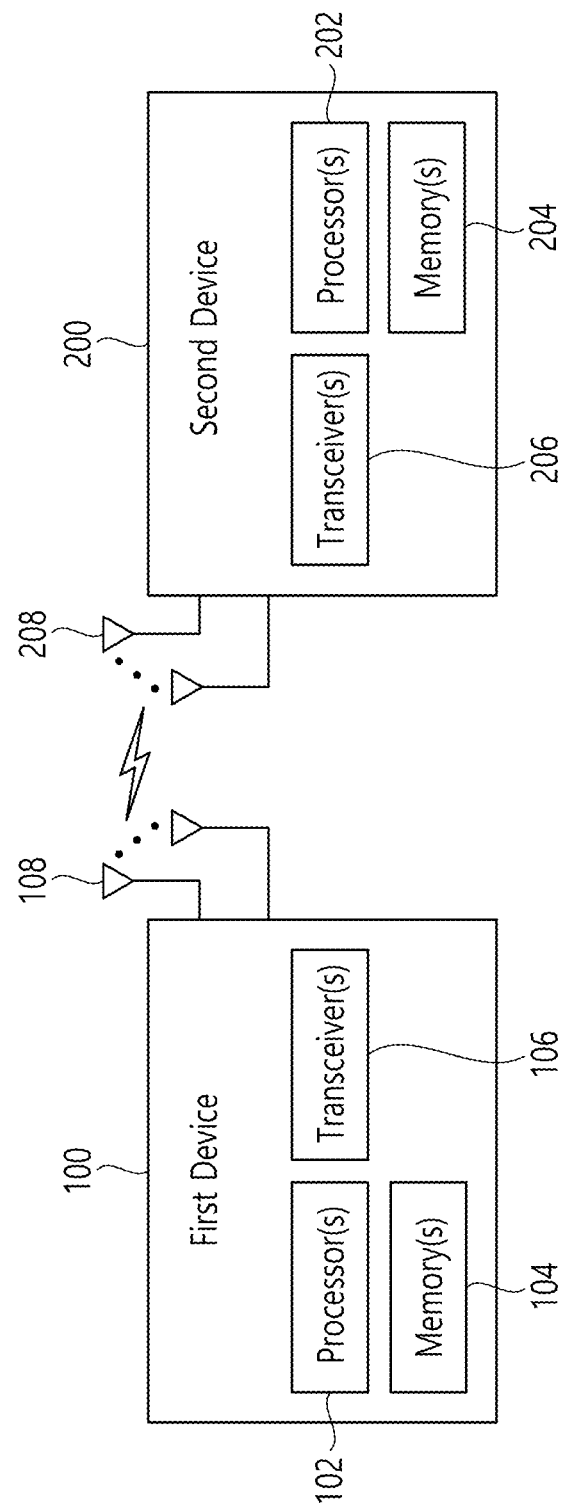
FIG. 24 shows wireless devices, in accordance with an embodiment of the present disclosure.

FIG. 24 shows wireless devices, in accordance with an embodiment of the present disclosure.

Referring to FIG. 24, a first wireless device 100 and a second wireless device 200 may transmit radio signals through various RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store various information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store various information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters.

Figure 25:
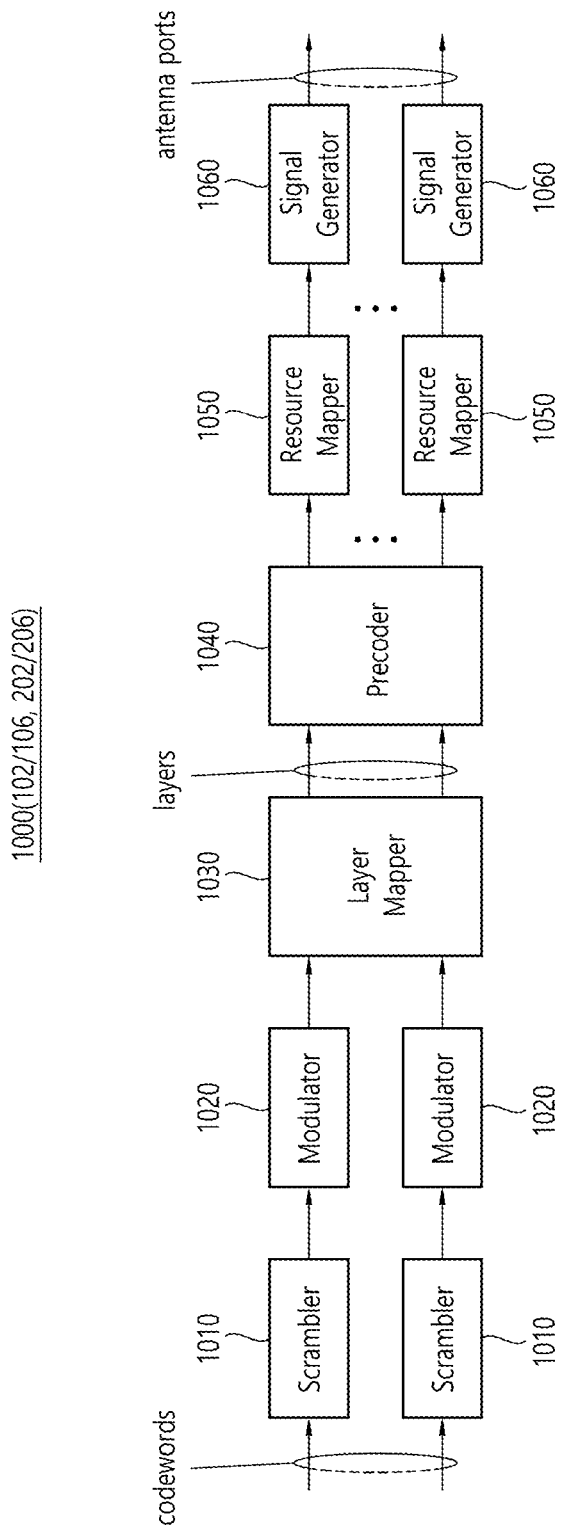
FIG. 25 shows a signal process circuit for a transmission signal, in accordance with an embodiment of the present disclosure.

FIG. 25 shows a signal process circuit for a transmission signal, in accordance with an embodiment of the present disclosure.

Referring to FIG. 25, a signal processing circuit 1000 may include scramblers 1010, modulators 1020, a layer mapper 1030, a precoder 1040, resource mappers 1050, and signal generators 1060. An operation/function of FIG. 25 may be performed, without being limited to, the processors 102 and 202 and/or the transceivers 106 and 206 of FIG. 24. Hardware elements of FIG. 25 may be implemented by the processors 102 and 202 and/or the transceivers 106 and 206 of FIG. 24. For example, blocks 1010 to 1060 may be implemented by the processors 102 and 202 of FIG. 24. Alternatively, the blocks 1010 to 1050 may be implemented by the processors 102 and 202 of FIG. 24 and the block 1060 may be implemented by the transceivers 106 and 206 of FIG. 24.

Codewords may be converted into radio signals via the signal processing circuit 1000 of FIG. 25. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 25. For example, the wireless devices (e.g., 100 and 200 of FIG. 24) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 26:
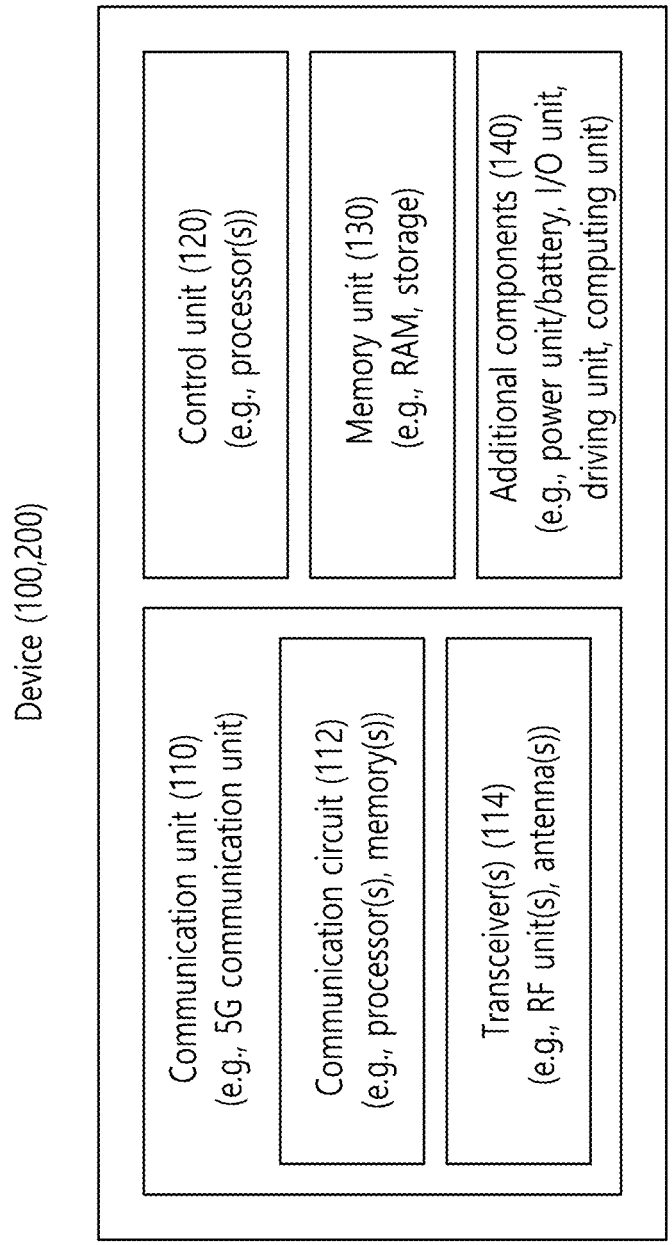
FIG. 26 shows another example of a wireless device, in accordance with an embodiment of the present disclosure.

FIG. 26 shows another example of a wireless device, in accordance with an embodiment of the present disclosure. The wireless device may be implemented in various forms according to a use-case/service (refer to FIG. 23).

Referring to FIG. 26, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114.

For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Figure 27:
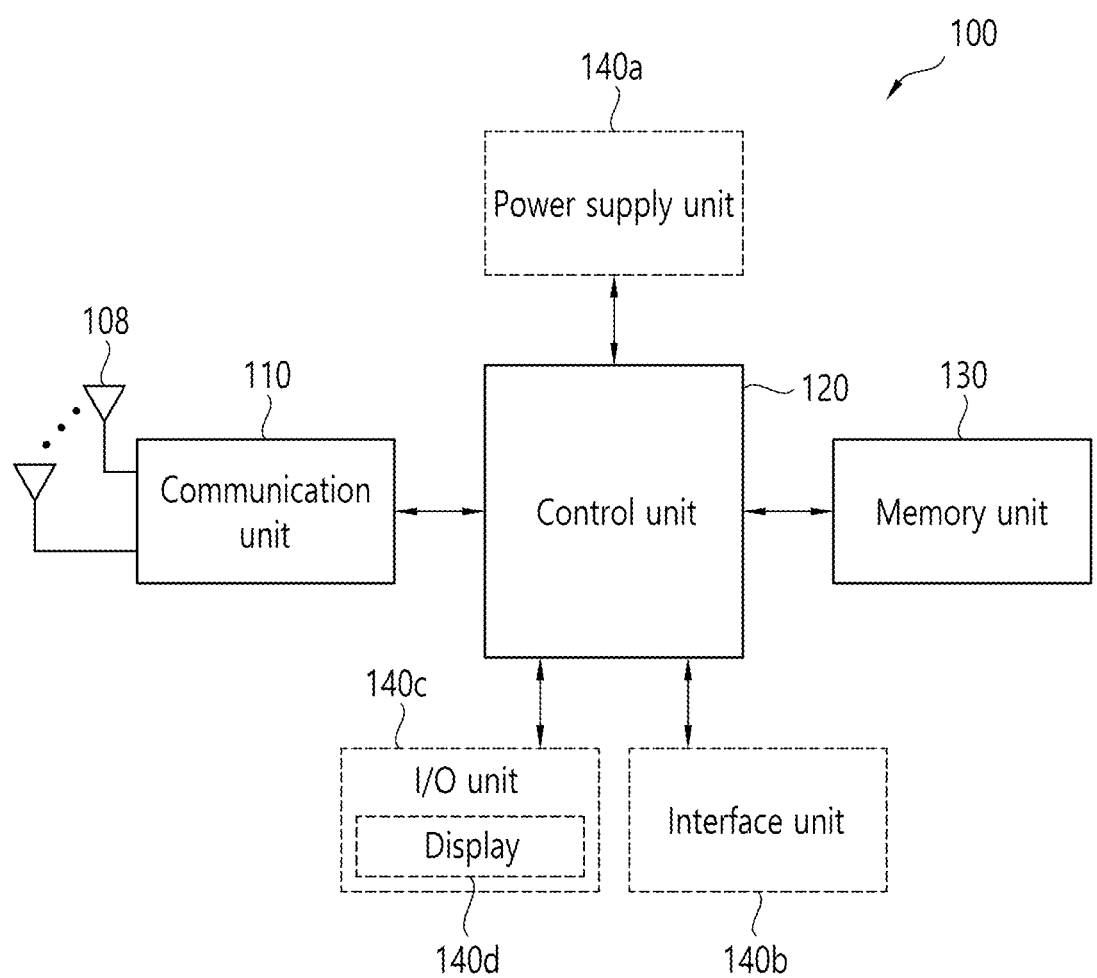
FIG. 27 shows a hand-held device, in accordance with an embodiment of the present disclosure.

FIG. 27 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 28:
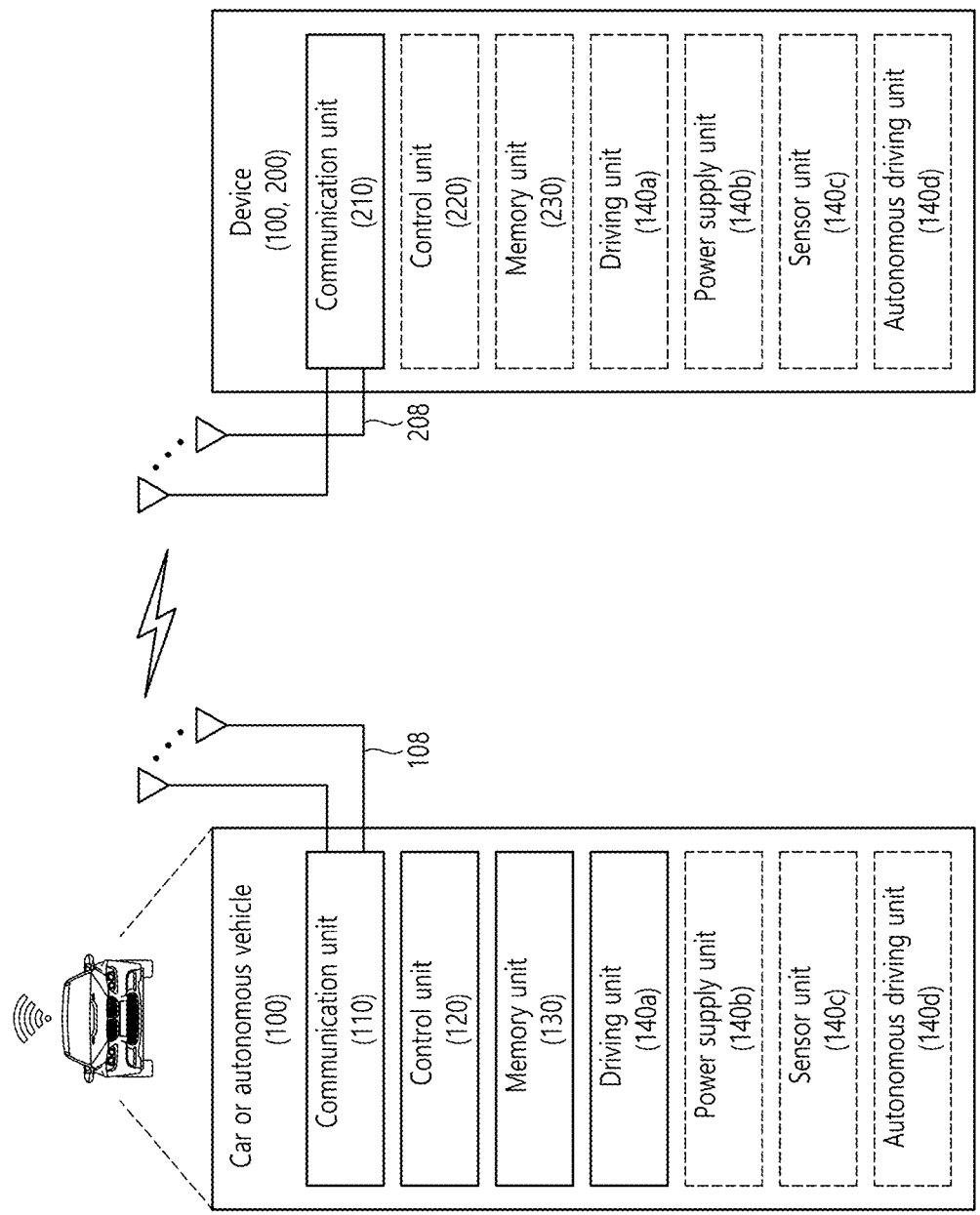
FIG. 28 shows a vehicle or an autonomous vehicle, in accordance with an embodiment of the present disclosure.

FIG. 28 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 28, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc., from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 29:
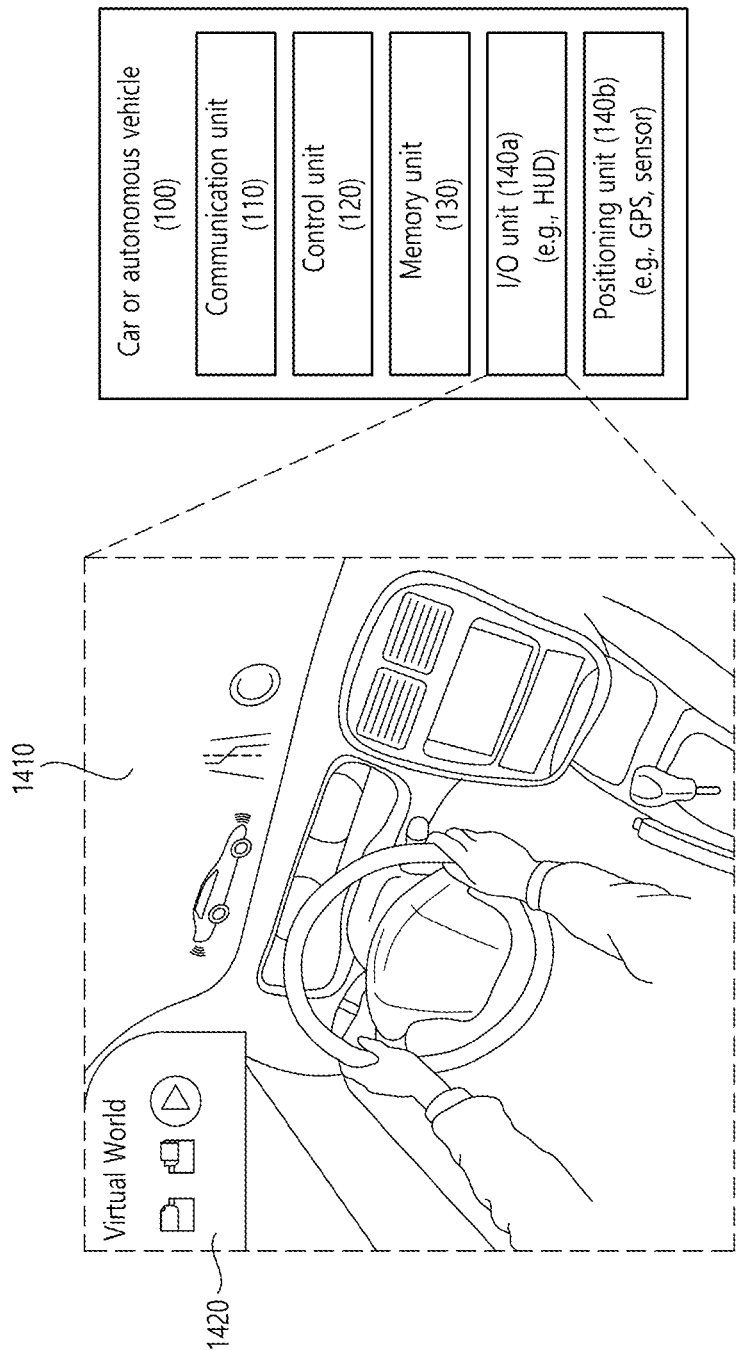
FIG. 29 shows a vehicle, in accordance with an embodiment of the present disclosure.

FIG. 29 shows a vehicle, in accordance with an embodiment of the present disclosure. The vehicle may be implemented as a transport means, an aerial vehicle, a ship, etc.

Referring to FIG. 29, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 26.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle 1410 and 1420. The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Figure 30:
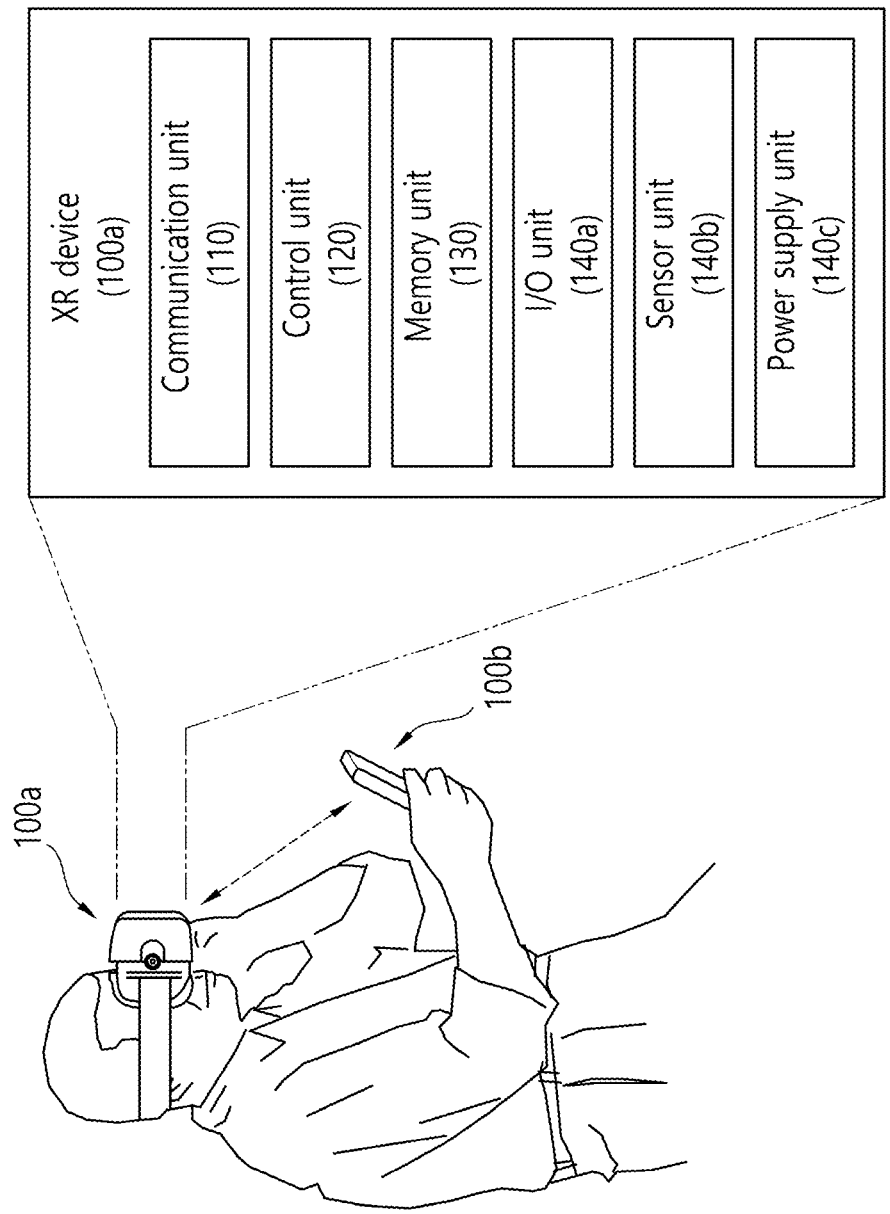
FIG. 30 shows an XR device, in accordance with an embodiment of the present disclosure.

FIG. 30 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 30, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 26, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Figure 31:
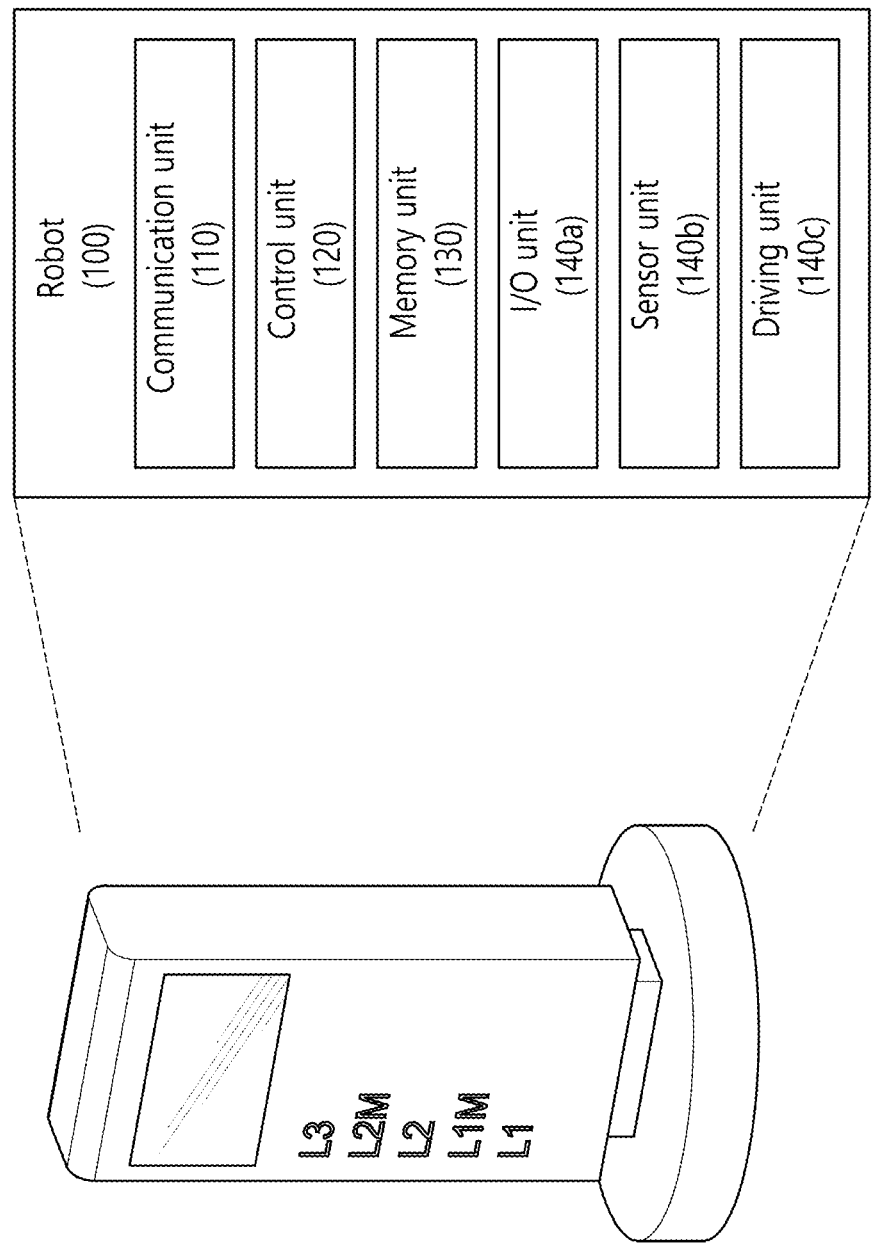
FIG. 31 shows a robot, in accordance with an embodiment of the present disclosure.

FIG. 31 shows a robot, in accordance with an embodiment of the present disclosure. The robot may be categorized into an industrial robot, a medical robot, a household robot, a military robot, etc., according to a used purpose or field.

Referring to FIG. 31, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 26, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Figure 32:
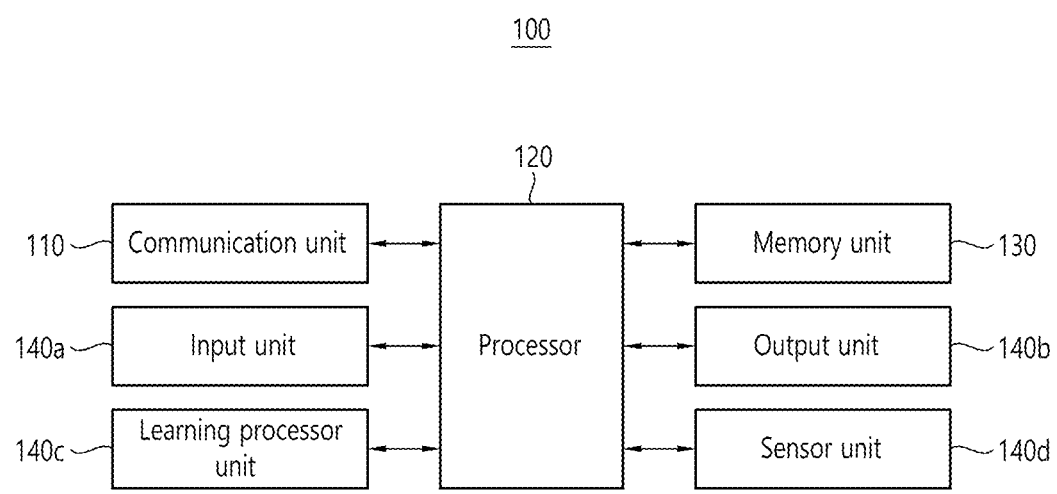
FIG. 32 shows an AI device, in accordance with an embodiment of the present disclosure.

FIG. 32 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 32, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 26, respectively.

The communication unit 110 may transmit and receive wired/radio signals (e.g., sensor information, user input, learning models, or control signals) to and from external devices such as other AI devices (e.g., 100x, 200, or 400 of FIG. 23) or an AI server (e.g., 400 of FIG. 23) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 23). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 23). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method of transmitting a Sidelink Hybrid Automatic Repeat Request (SL HARQ) feedback by a first device, the method comprising:
    receiving, from a second device, a Physical Sidelink Control Channel (PSCCH);
    receiving, from the second device, a Physical Sidelink Shared Channel (PSSCH) related to the PSCCH;
    determining a feedback resource related to transmission of the SL HARQ feedback, among a plurality of feedback resources, based on (i) an identifier (ID) of the first device which is provided to the first device for groupcast communication and (ii) a source ID of the second device; and
    transmitting, to the second device, the SL HARQ feedback related to the PSSCH based on the feedback resource.

2. The method of claim 1, wherein the SL HARQ feedback includes positive acknowledgment (ACK) or negative acknowledgment (NACK) in the groupcast communication.

3. The method of claim 1, wherein the first device and the second device belong to a group for the groupcast communication, and
    wherein IDs of a plurality of devices are different within the group.

4. The method of claim 1, wherein the feedback resource related to transmission of the SL HARQ feedback is related with a resource related to the PSSCH.

5. The method of claim 1, wherein the feedback resource related to transmission of the SL HARQ feedback is determined, among the plurality of feedback resources, based on (i) the ID of the first device, (ii) the source ID of the second device and (iii) information regarding a resource related to the PSSCH.

6. The method of claim 5, wherein the information regarding the resource related to the PSSCH includes information regarding a time resource related to the PSSCH and information regarding a frequency resource related to the PSSCH.

7. The method of claim 1, wherein the source ID of the second device is received from the second device through the PSSCH.

8. The method of claim 1, wherein a time gap between a resource related to the PSSCH and the feedback resource related to transmission of the SL HARQ feedback is configured for the first device and the second device.

9. The method of claim 8, wherein the time gap is configured for the first device and the second device in a resource pool.

10. The method of claim 8, wherein the time gap is configured for the first device and the second device per a resource pool.

11. The method of claim 8, wherein the time gap configured for the first device in a resource pool and the time gap configured for the second device in the resource pool is same.

12. The method of claim 1, wherein the feedback resource related to transmission of the SL HARQ feedback is included in a frequency domain related to the PSSCH.

13. The method of claim 1, further comprising:
    measuring a channel status between the first device and the second device based on a demodulation reference signal (DMRS) included in the PSSCH; and
    determining transmit power of the SL HARQ feedback based on the channel status.

14. The method of claim 13, wherein the transmit power of the SL HARQ feedback is determined based on a SL communication type.

15. A first device adapted to transmit a Sidelink Hybrid Automatic Repeat Request (SL HARQ) feedback, the first device comprising:
    one or more transceivers;
    one or more processors; and
    one or more computer memories operably connectable to the one or more processors and storing information that, when executed by the one or more processors, perform operations comprising:
    receiving, through the one or more transceivers, from a second device, a Physical Sidelink Control Channel (PSCCH);
    receiving, through the one or more transceivers, from the second device, a Physical Sidelink Shared Channel (PSSCH) related to the PSCCH;
    determining a feedback resource related to transmission of the SL HARQ feedback, among a plurality of feedback resources, based on (i) an identifier (ID) of the first device which is provided to the first device for groupcast communication and (ii) a source ID of the second device; and
    transmitting, through the one or more transceivers, to the second device, the SL HARQ feedback related to the PSSCH based on the feedback resource.

16. The first device of claim 15, wherein the SL HARQ feedback includes positive acknowledgment (ACK) or negative acknowledgment (NACK) in the groupcast communication.

17. The first device of claim 15, wherein the first device and the second device belong to a group for the groupcast communication, and
    wherein IDs of a plurality of devices are different within the group.

18. The first device of claim 15, wherein the feedback resource related to transmission of the SL HARQ feedback is related with a resource related to the PSSCH.

19. The first device of claim 15, wherein the feedback resource related to transmission of the SL HARQ feedback is determined, among the plurality of feedback resources, based on (i) the ID of the first device, (ii) the source ID of the second device and (iii) information regarding a resource related to the PSSCH.

20. A non-transitory computer-readable storage medium storing instructions that, when executed, cause a first device to:
    receive, from a second device, a Physical Sidelink Control Channel (PSCCH);
    receive, from the second device, a Physical Sidelink Shared Channel (PSSCH) related to the PSCCH;
    determine a feedback resource related to transmission of a Sidelink Hybrid Automatic Repeat Request (SL HARQ) feedback, among a plurality of feedback resources, based on (i) an identifier (ID) of the first device which is provided to the first device for groupcast communication and (ii) a source ID of the second device; and
    transmit, to the second device, the SL HARQ feedback related to the PSSCH based on the feedback resource.

* * * * *